United States Patent
Kaneda et al.

(10) Patent No.: US 11,408,958 B2
(45) Date of Patent: Aug. 9, 2022

(54) MANAGEMENT DEVICE, MANAGEMENT SYSTEM, AND POSITION CORRECTION METHOD

(71) Applicant: PANASONIC INTELLECTUAL PROPERTY MANAGEMENT CO., LTD., Osaka (JP)

(72) Inventors: Ayano Kaneda, Kanagawa (JP); Kohtaro Matsumuro, Kanagawa (JP); Hiroshi Noguchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 136 days.

(21) Appl. No.: 17/041,988

(22) PCT Filed: Mar. 8, 2019

(86) PCT No.: PCT/JP2019/009453
§ 371 (c)(1),
(2) Date: Feb. 3, 2021

(87) PCT Pub. No.: WO2019/188139
PCT Pub. Date: Oct. 3, 2019

(65) Prior Publication Data
US 2021/0255270 A1 Aug. 19, 2021

(30) Foreign Application Priority Data

Mar. 28, 2018 (JP) .............................. JP2018-061488

(51) Int. Cl.
*H04W 24/00* (2009.01)
*G01S 1/68* (2006.01)
(Continued)

(52) U.S. Cl.
CPC .................................... *G01S 1/68* (2013.01); *G01S 5/02* (2013.01); *H04W 4/024* (2018.02); *H04W 4/029* (2018.02); *H04W 4/33* (2018.02)

(58) Field of Classification Search
CPC . G01S 1/68; G01S 5/02; G01S 5/0269; G01S 5/0027; H04W 4/024; H04W 4/029; H04W 4/33; G01C 21/30; G06Q 50/10
(Continued)

(56) References Cited

U.S. PATENT DOCUMENTS 9,121,711 B2 * 9/2015 Tidd ...................... G01C 21/206
10,368,200 B2 * 7/2019 Ryu ........................ G01S 5/0263
(Continued)

FOREIGN PATENT DOCUMENTS

| JP | 2006-236146 | 9/2006 |
| JP | 2012-068041 | 4/2012 |
| JP | 2016-206016 | 12/2016 |

OTHER PUBLICATIONS

International Search Report (ISR) from International Searching Authority (Japan Patent Office) in International Pat. Appl. No. PCT/JP2019/009453, dated Apr. 16, 2019, together with an English language translation thereof.
(Continued)

*Primary Examiner* — Amancio Gonzalez
(74) *Attorney, Agent, or Firm* — Greenblum & Bernstein, P.L.C.

(57) ABSTRACT

The present application relates to correction of position data used in a position information collection system, in which measurement points correspond to position data of a mobile body at respective time points and a movement path of the mobile body connects the measurement points in a time series. When the position data produces a movement path of the mobile body which passes through a not-enterable area,
(Continued)

the position data is corrected such that the movement path of the mobile body circumvents the not-enterable area without reducing positioning accuracy, by performing position correction operations which include: determining a crossing status with regard to how the movement path crosses the not-enterable area; counting a number of the measurement points within the not-enterable area; and correcting the position data such that the movement path circumvents the not-enterable area.

20 Claims, 28 Drawing Sheets

(51) Int. Cl.
   *H04W 4/024* (2018.01)
   *H04W 4/33* (2018.01)
   *H04W 4/029* (2018.01)
   *G01S 5/02* (2010.01)

(58) Field of Classification Search
   USPC .......................................... 455/456.1
   See application file for complete search history.

(56) References Cited

U.S. PATENT DOCUMENTS

| | | | |
|---|---|---|---|
| 11,143,519 B2* | 10/2021 | Ramasamy | G01C 21/3438 |
| 11,282,393 B2* | 3/2022 | Yun | H04W 4/02 |
| 2010/0217672 A1* | 8/2010 | Maeno | H04L 67/18 |
| | | | 340/572.1 |
| 2013/0016012 A1* | 1/2013 | Beauregard | H04W 4/023 |
| | | | 342/450 |
| 2016/0192140 A1* | 6/2016 | Park | H04W 40/244 |
| | | | 455/456.3 |
| 2018/0007515 A1* | 1/2018 | Arslan | G01C 21/206 |
| 2019/0195635 A1* | 6/2019 | Shu | G01C 21/14 |

OTHER PUBLICATIONS

Matsuo et al., "A Tracking System using Digital Portable Telephones for the Wandering Elderly", ITE Technical Report, vol. 20, No. 26, Sep. 13, 1996, pp. 85-92.

* cited by examiner

Fig.9

|  | MVH crosses two adjacent sides (two-adjacent-side crossing) | MVH crosses two opposite sides (two-opposite-side crossing) | MVH crosses only one side (one-side crossing) |
|---|---|---|---|
| No MP (measurement point) in NEA (not-enterable area) | first pattern | second pattern | — |
| # of MPs in NEA < threshold | third pattern | fourth pattern | fifth pattern |
| # of MPs in NEA ≥ threshold | sixth pattern | seventh pattern | eighth pattern |

MVH: movement path

MANAGEMENT DEVICE, MANAGEMENT SYSTEM, AND POSITION CORRECTION METHOD

TECHNICAL FIELD

The present invention relates to a management device and a management system for managing position information including position data of a mobile body, and a position correction method for correcting position information including position data of a mobile body.

BACKGROUND ART

Known positioning technologies include a system configured to correct position data of a terminal carried by a person and perform various analyses using the collected position data, thereby producing results of various analyses of behavior of the person, such as a movement path of the person. However, positioning errors can occur due to various factors, which leads to generation of an abnormal movement path, the movement path being created by measuring positions at respective times and connecting the positions in a time series.

In particular, when there is a not-enterable area where any person cannot enter (e.g. a place in which a pillar, furniture, and/or fixtures are present), any movement path of a person should never pass through the not-enterable area. However, positioning errors can produce an abnormal movement path which passes the not-enterable area, which results in that users are unable to properly grasp behavior of a person. Thus, there is a need for a technology to properly correct position information when a generated movement path of a mobile body crosses a not-enterable area.

Known such technologies for correcting position information include a technology to correct position information such that a generated movement path circumvents a not-enterable area (Patent Document 1).

PRIOR ART DOCUMENT (S)

Patent Document(S)

Patent Document 1: JP2006-236146A

SUMMARY OF THE INVENTION

Task to be Accomplished by the Invention

However, in the above-described prior art, since position information is corrected such that a movement path circumvents a not-enterable area by the shortest path, a movement path generated from corrected position information can be made further away from the actual movement path, resulting in a problem of a reduction in positioning accuracy.

The present invention has been made in view of the problem of the prior art, and a primary object of the present invention is to provide a management device, a management system, and a position correction method which enable position information to be corrected such that a movement path circumvents a not-enterable area without reducing positioning accuracy.

Means to Accomplish the Task

An aspect of the present invention provides a management device for managing position information including position data of a mobile body, the device comprising: a storage configured to store and retain position data of the mobile body at respective time points; and a controller, wherein measurement points correspond to position data of the mobile body at respective time points, and a movement path of the mobile body connects the measurement points in a time series, and wherein, when the movement path passes through a not-enterable area, the controller: determines a crossing status with regard to how the movement path crosses the not-enterable area; counts a number of the measurement points within the not-enterable area; and corrects the position data such that the movement path circumvents the not-enterable area, using a division into cases based on the crossing status and the number of measurement points within the not-enterable area.

Another aspect of the present invention provides a management system in which a management device manages position information including position data of a mobile body, wherein the management device comprises: a storage configured to store and retain position data of the mobile body at respective time points; and a controller, wherein measurement points correspond to position data of the mobile body at respective time points, and a movement path of the mobile body connects the measurement points in a time series, and wherein, when the movement path passes through a not-enterable area, the controller: determines a crossing status with regard to how the movement path crosses the not-enterable area; counts a number of the measurement points within the not-enterable area; and corrects the position data such that the movement path circumvents the not-enterable area, using a division into cases based on the crossing status and the number of measurement points within the not-enterable area.

Yet another aspect of the present invention provides a position correction method for correcting accumulated position information including position data of a mobile body, wherein measurement points correspond to position data of the mobile body at respective time points, and a movement path of the mobile body connects the measurement points in a time series, and wherein, when the movement path passes through a not-enterable area, the method is performed by a management device, which method comprises: determining a crossing status with regard to how the movement path crosses the not-enterable area; counting a number of the measurement points within the not-enterable area; and correcting the position data such that the movement path circumvents the not-enterable area, using a division into cases based on the crossing status and the number of measurement points within the not-enterable area.

Effect of the Invention

According to the present invention, position information is corrected using a division into cases based on a crossing status with regard to how a movement path crosses a not-enterable area, and a number of measurement points within the not-enterable area. This enables position information to be corrected such that the movement path circumvents the not-enterable area without reducing positioning accuracy.

BRIEF DESCRIPTION OF THE DRAWINGS

FIG. 9 is an explanatory diagram showing patterns of divided cases for which corresponding correction operations are performed;

DESCRIPTION OF THE PREFERRED EMBODIMENT(S)

Figure 1:
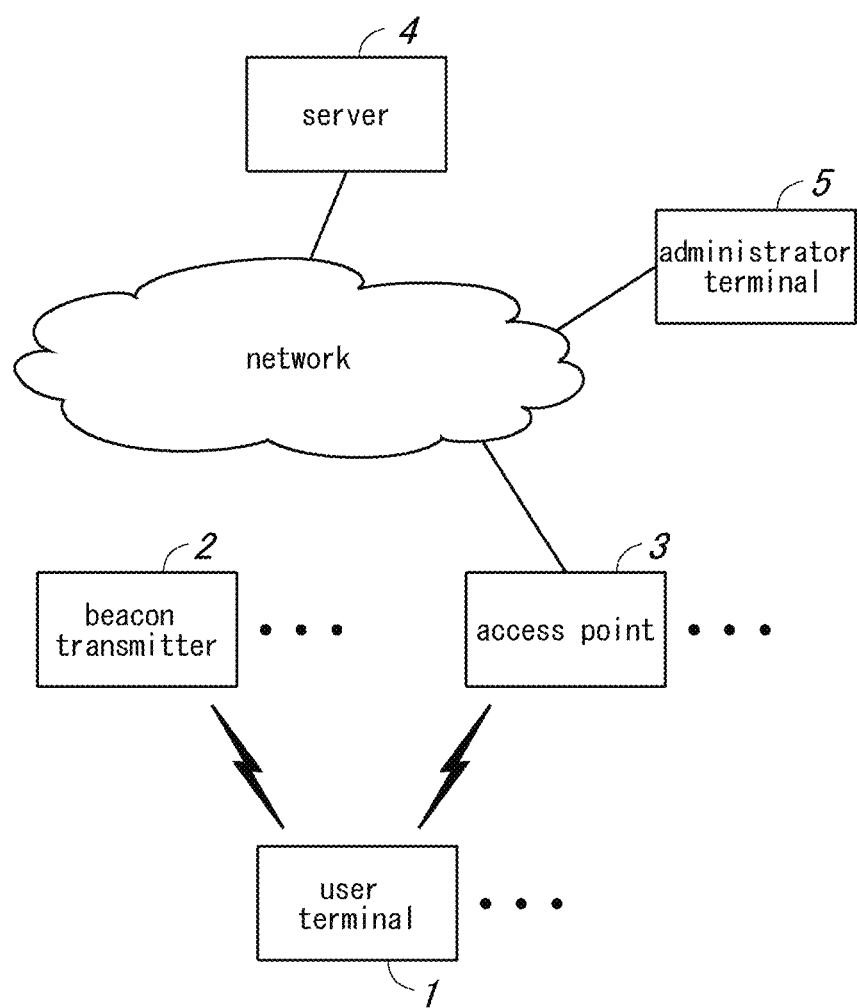
FIG. 1 is a diagram showing a general configuration of a position information collection system according to an embodiment of the present invention.

A first aspect of the present invention made to achieve the above-described object is a management device for managing position information including position data of a mobile body, the device comprising: a storage configured to store and retain position data of the mobile body at respective time points; and a controller, wherein measurement points correspond to position data of the mobile body at respective time points, and a movement path of the mobile body connects the measurement points in a time series, and wherein, when the movement path passes through a not-enterable area, the controller: determines a crossing status with regard to how the movement path crosses the not-enterable area; counts a number of the measurement points within the not-enterable area; and corrects the position data such that the movement path circumvents the not-enterable area, using a division into cases based on the crossing status and the number of measurement points within the not-enterable area.

In this configuration, position information is corrected using a division into cases based on a crossing status with regard to how a movement path crosses a not-enterable area, and a number of measurement points within the not-enterable area. This enables position information to be corrected such that the movement path circumvents the not-enterable area without reducing positioning accuracy.

A second aspect of the present invention is the management device of the first aspect, wherein the controller is configured to: set a circumventing rectangle around the not-enterable area, wherein the circumventing rectangle has two pairs of opposite sides extending in first and second directions in a Cartesian coordinate system, respectively; and correct the position data of measurement points which are correction targets, to position data of positions on the circumventing rectangle.

In this configuration, position information can be corrected such that the movement path circumvents the not-enterable area through a simple operation procedure.

A third aspect of the present invention is the management device of the second aspect, wherein the correction targets include the measurement points within the not-enterable area, a measurement point immediately before the movement path enters the not-enterable area, and a measurement point immediately after the movement path exits the not-enterable area, wherein the controller is configured to: correct position data of the measurement points which are the correction targets, to position data of positions on the circumventing rectangle.

In this configuration, position information can be corrected such that the movement path circumvents the not-enterable area with certainty.

A fourth aspect of the present invention is the management device the second aspect, wherein, when no measurement point is present within the not-enterable area, the controller sets at least one vertex of the circumventing rectangle as a circumventing point, and corrects position data of two measurement points to position data of the circumventing point, wherein the two measurement points are a measurement point immediately before the movement path enters the not-enterable area, and a measurement point immediately after the movement path exits the not-enterable area.

In this configuration, position information can be corrected such that the movement path circumvents the not-enterable area when there is no measurement point within the not-enterable area.

A fifth aspect of the present invention is the management device of the fourth aspect, wherein, when the movement path crosses two adjacent sides of the not-enterable area at entrance and exit points, respectively, the controller sets a vertex of the circumventing rectangle as a circumventing point such that the vertex is close to an intersection of the two adjacent sides of the not-enterable area.

In this configuration, position information can be properly corrected in the case where there is no measurement point within the not-enterable area and the movement path crosses two adjacent sides of the not-enterable area.

A sixth aspect of the present invention is the management device of the fourth aspect, wherein, when the movement path crosses two opposite sides of the not-enterable area at entrance and exit points, respectively, the controller sets two adjacent vertices of the circumventing rectangle as circumventing points such that one of the two vertices is closest to the exit point, and the two vertices are adjacent to each other in a passing-through direction in which the movement path passes through the not-enterable area.

In this configuration, position information can be properly corrected in the case where there is no measurement point within the not-enterable area and the movement path crosses two opposite sides of the not-enterable area.

A seventh aspect of the present invention is the management device of the second aspect, wherein, when the number of measurement points within the not-enterable area is less than a predetermined number, the controller sets one or more vertices of the circumventing rectangle as circumventing points; and corrects position data of the measurement points within the not-enterable area to position data of the circumventing points.

In this configuration, position information can be corrected such that the movement path circumvents the not-enterable area in the case where there are a small number of measurement points within the not-enterable area.

An eighth aspect of the present invention is the management device of the seventh aspect, wherein, when the movement path crosses two adjacent sides of the not-enterable area at entrance and exit points, respectively, the controller sets a vertex of the circumventing rectangle as a circumventing point such that the vertex is close to an intersection of the two sides of the not-enterable area.

In this configuration, position information can be properly corrected in the case where there are a small number of measurement points within the not-enterable area and the movement path crosses two adjacent sides of the not-enterable area.

A ninth aspect of the present invention is the management device according to claim 7, wherein, when the movement path crosses two opposite sides of the not-enterable area at entrance and exit points, respectively, the controller divides the not-enterable area into two sub-areas by a center line parallel to a passing-through direction in which the movement path passes through the not-enterable area, counts respective numbers of the measurement points within the two sub-areas, chooses one sub-area with a greater number of measurement points, and sets two adjacent vertices of the circumventing rectangle as circumventing points such that the two vertices are close to the chosen sub-area with the greater number of measurement points.

In this configuration, position information can be properly corrected in the case where there are a small number of measurement points within the not-enterable area and the movement path crosses two opposite sides of the not-enterable area.

A tenth aspect of the present invention is the management device of the ninth aspect, wherein, when the respective numbers of the measurement points within the two sub-areas are equal to each other, the controller sets two adjacent vertices of the circumventing rectangle as circumventing points such that one of the two vertices is closest to the exit point, and the two vertices are adjacent to each other in the passing-through direction.

In this configuration, a circumventing point can be properly determined even when the respective numbers of the measurement points within the two sub-areas are equal to each other.

An eleventh aspect of the present invention is the management device of the first aspect, wherein, when the number of measurement points within the not-enterable area is less than a predetermined number and the movement path crosses only one side of the not-enterable area, the controller corrects position data of measurement points within the not-enterable area to position data of a measurement point immediately before the movement path enters the not-enterable area.

In this configuration, position information can be properly corrected in the case where there are a small number of measurement points within the not-enterable area and the movement path crosses only one side of the not-enterable area.

A twelfth aspect of the present invention is the management device of the second aspect, wherein, when the number of measurement points within the not-enterable area is greater than a predetermined number, the controller determines a circumventing path on one or more sides of the circumventing rectangle; and corrects position data of the measurement points within the not-enterable area to position data of one or more positions on the circumventing path.

In this configuration, position information can be corrected such that the movement path circumvents the not-enterable area in the case where there are a large number of measurement points within the not-enterable area.

A thirteenth aspect of the present invention is the management device of the twelfth aspect, wherein, when the movement path crosses entrance and exit sides of the not-enterable area at entrance and exit points, respectively, the entrance and exit sides being adjacent to each other, the controller divides the not-enterable area into four sub-areas by center lines in the first and second directions, counts respective numbers of measurement points within the four sub-areas, chooses one sub-area with a greatest number of measurement points in the four sub-areas, and determines a circumventing path on two adjacent sides of the circumventing rectangle such that the two sides are close to the chosen sub-area with the greatest number of measurement points, and then corrects position data of the measurement points within the not-enterable area to position data of positions on the circumventing path by changing positions of one or more measurement points close to the entrance point to those of perpendicular foot points drawn on the circumventing path close to the entrance side of the not-enterable area, and by changing positions of one or more measurement points close to the exit point to those of perpendicular foot points drawn on the circumventing path close to the exit side of the not-enterable area.

In this configuration, position information can be properly corrected in the case where there are a large number of measurement points within the not-enterable area and the movement path crosses two adjacent sides of the not-enterable area.

A fourteenth aspect of the present invention is the management device of the thirteenth aspect, wherein, when the numbers of measurement points of two or more sub-areas are equal to each other and greatest in the four sub-areas, the controller sets the circumventing path on two side of the circumventing rectangle which are close to the entrance and exit sides of the not-enterable area, respectively.

In this configuration, a circumventing path can be properly determined even when there are two or more sub-areas with the largest number of measurement points.

A fifteenth aspect of the present invention is the management device of the thirteenth aspect, wherein the controller calculates first and second moving distances in the first and second directions of the movement path between the entrance point and the exit point, respectively, and determines, based on a rate of the first moving distance to the second moving distance, first and second sets of measurement points, wherein the first set of measurement points have positions to be changed to those on the circumventing path extending in the first direction, and the second set of measurement points have positions to be changed to those on the circumventing path extending in the second direction.

In this configuration, measurement points can be assigned to positions on the circumventing path extending in the first direction and those on the circumventing path extending in the second direction such that the assigned positions on the circumventing path are separated from one another at proper intervals.

A sixteenth aspect of the present invention is the management device of the twelfth aspect, wherein, when the movement path crosses two opposite sides of the not-enterable area at entrance and exit points, respectively, the controller divides the not-enterable area into two sub-areas by a center line parallel to parallel to a passing-through direction in which the movement path passes through the not-enterable area, counts respective numbers of the measurement points within the two sub-areas, chooses one sub-area with a greater number of measurement points, and determines a circumventing path on one side of the circumventing rectangle such that the one side is one of the sides parallel to the passing-through direction and closer to the exit point, and then corrects position data of the measurement points within the not-enterable area to position data of positions on the circumventing path by changing positions of the measurement points within the not-enterable area to those of perpendicular foot points drawn on the circumventing path.

In this configuration, position information can be properly corrected in the case where when there are a large number of measurement points within the not-enterable area and the movement path crosses two opposite sides of the not-enterable area.

A seventeenth aspect of the present invention is the management device of the sixteenth aspect, wherein, when the respective numbers of the measurement points within the two sub-areas are equal to each other, the controller determines the circumventing path on one side of the circumventing rectangle such that the one side is one of the sides parallel to the passing-through direction and closer to the exit point.

In this configuration, a circumventing path can be properly determined even when the respective numbers of the measurement points within the two sub-areas are equal to each other.

An eighteenth aspect of the present invention is the management device of the twelfth aspect, wherein, when the movement path crosses only one side of the not-enterable area, the controller determines the circumventing path on one side of the circumventing rectangle such that the one side is one of the four sides closest to an entrance side of the not-enterable area where the movement path enters the not-enterable area, and corrects position data of the measurement points within the not-enterable area to position data of positions on the circumventing path by changing position of the measurement points within the not-enterable area to those of perpendicular foot points drawn on the circumventing path.

In this configuration, position information can be properly corrected in the case where there are a large number of measurement points within the not-enterable area and the movement path crosses only one side of the not-enterable area.

A nineteenth aspect of the present invention is a management system in which a management device manages position information including position data of a mobile body, wherein the management device comprises: a storage configured to store and retain position data of the mobile body at respective time points; and a controller, wherein measurement points correspond to position data of the mobile body at respective time points, and a movement path of the mobile body connects the measurement points in a time series, and wherein, when the movement path passes through a not-enterable area, the controller: determines a crossing status with regard to how the movement path crosses the not-enterable area; counts a number of the measurement points within the not-enterable area; and corrects the position data such that the movement path circumvents the not-enterable area, using a division into cases based on the crossing status and the number of measurement points within the not-enterable area.

In this configuration, position information can be corrected such that the movement path circumvents the not-enterable area without reducing positioning accuracy in the same manner as the first aspect of the present invention.

A twentieth aspect of the present invention is a position correction method for correcting accumulated position information including position data of a mobile body, wherein measurement points correspond to position data of the mobile body at respective time points, and a movement path of the mobile body connects the measurement points in a time series, and wherein, when the movement path passes through a not-enterable area, the method is performed by a management device, which method comprises: determining a crossing status with regard to how the movement path crosses the not-enterable area; counting a number of the measurement points within the not-enterable area; and correcting the position data such that the movement path circumvents the not-enterable area, using a division into cases based on the crossing status and the number of measurement points within the not-enterable area.

In this configuration, position information can be corrected such that the movement path circumvents the not-enterable area without reducing positioning accuracy in the same manner as the first aspect of the present invention.

Embodiments of the present invention will be described below with reference to the drawings.

First Embodiment

FIG. 1 is a diagram showing a general configuration of a position information collection system according to an embodiment of the present invention.

The position information collection system is configured for collecting position information including position data of people who stay in a building (target area) of a facility such as a factory, and includes a user terminal 1 (terminal device, mobile body), a beacon transmitter 2, an access point 3, a server 4 (management device), and an administrator terminal 5. Although an embodiment in which the beacon transmitter 2 and the access point 3 are used to correct position data will be described, any known technique may be used to accumulate position data of a mobile body in the server 4.

The user terminal 1 is configured to communicate with the server 4 via the access point 3 and transmits a positioning result notification including a terminal ID (terminal identifier), position data, and a positioning time to the server 4. The user terminal 1 may be not only a dedicated device for collecting position data, but also a mobile terminal such as a smartphone on which an application program for collecting position data is installed.

The beacon transmitter 2 is installed in a building and transmits a beacon signal used for positioning by using Bluetooth (Registered Trademark) or any suitable communication method. The beacon signal is received by the user terminal 1, and the user terminal 1 performs positioning based on the received beacon signal.

The access point 3 is installed in the building and relays communication between the user terminal 1 and the server 4.

The server 4 collects the position data of users located in the building. The server 4 is configured to communicate with the user terminal 1 via a network and the access point 3, receive a positioning result notification transmitted from the user terminal 1 and store and retain information included in the positioning result notification (such as terminal ID, position data, moving distance, positioning time). In other embodiments, a user terminal 1 may be configured to, instead of calculating position data, transmit information necessary for calculating position data to the server 4 so that the server 4 can use the received information to calculate position data and store and retain the calculated position data therein.

In the present embodiment, the server 4 communicates with the user terminal 1 to collect the user's position data. However, the way to accumulate position data in the server 4 is not limited to this. In some embodiments, the server 4 may be configured to acquire at one time the whole position data of a mobile body which has previously collected from the outside, and store and retain the acquired position data therein. In other embodiments, the system may be configured such that a mobile body carries an RFID tag and RFID readers installed on movement paths read information stored in the RFID tag in sequence and transmit the read information to the server 4 so that the server 4 can store and retain the information therein. Alternatively, the system may be configured such that cameras installed along moving paths are used to acquire images of a mobile body and identify the mobile body through image recognition, and the server acquires and stores and retains an ID of the mobile body and position data of respective cameras.

In addition, the server 4 performs various analyzing operations related to the user's behavior, (e.g., an operation of generating a movement path) based on the collected position data of the user terminal 1.

The administrator terminal 5 may be a device such as a personal computer or a tablet terminal, and is operated by an administrator. The administrator terminal 5 allows an administrator to start a browser and access the server 4, thereby viewing various analysis results provided from the server 4 such as a movement path of each person.

Figure 2:
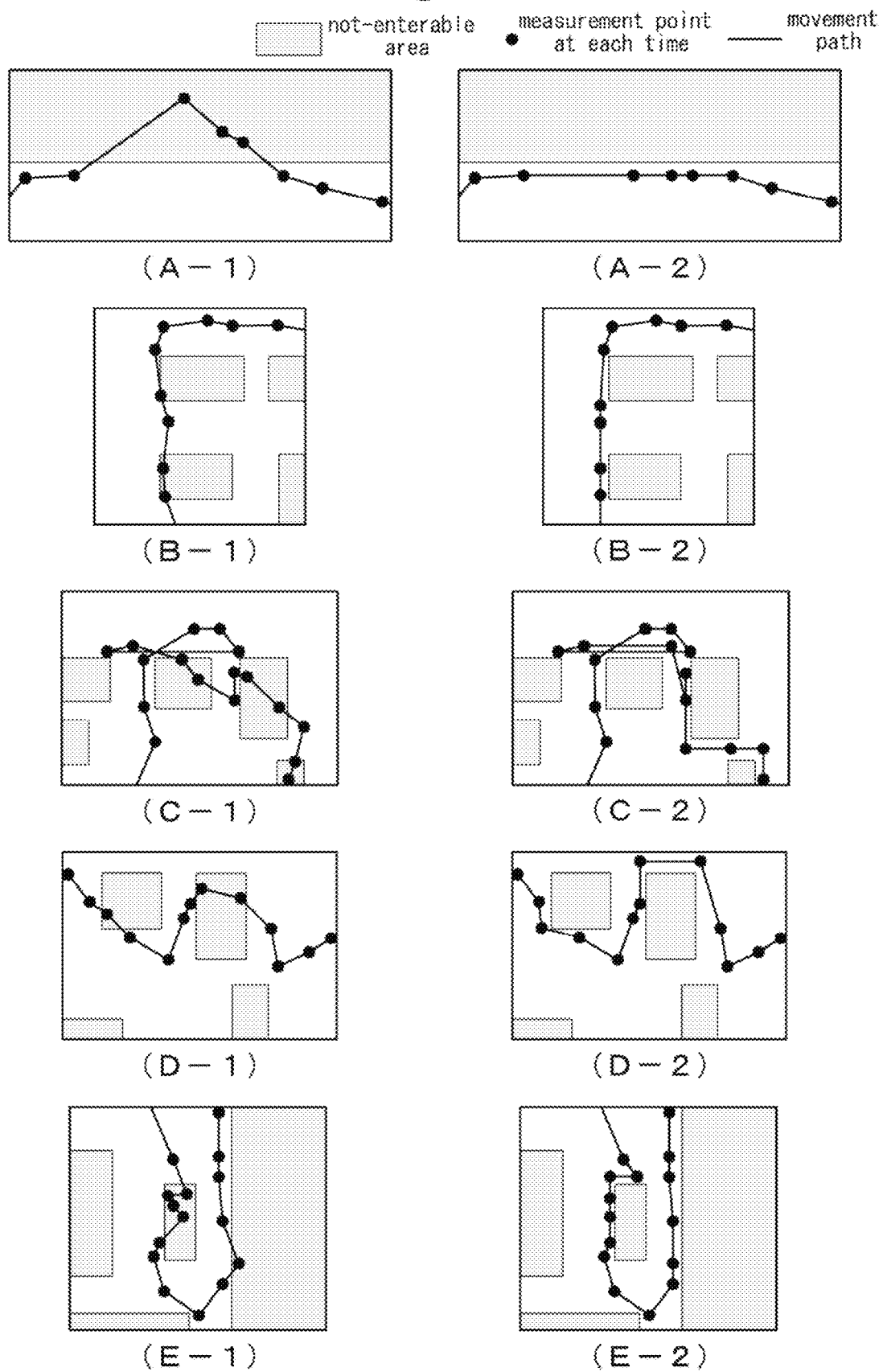
FIG. 2 is an explanatory drawing showing specific examples of movement paths.

Next, movement paths output from the server 4 as analysis results will be described. FIG. 2 is an explanatory drawing showing specific examples of movement paths.

The user terminal 1 receives a beacon signal transmitted from the beacon transmitter 2 installed in the building, and acquires position data of the user terminal based on the radio wave strength of the beacon signal.

In such indoor positioning, positioning errors occur due to the change in the radio wave intensity of a beacon signal for various reasons. In addition, although a movement path of a person should never pass through a not-enterable area (NEA) where any person cannot enter (e.g. a place in which a wall, a pillar, and/or a fixture such as a desk are present), a movement path, which connect measurement points (MPs) corresponding to position data at respective time points in a time series, can pass through such a not-enterable area as shown in FIGS. 2A-1 to 2E-1 because of positioning errors.

When a movement path passes through the not-enterable area in this way, it becomes difficult for users to grasp behavior of a person. Thus, in the present embodiment, whether or not there is any measurement point in the not-enterable area, when part of a movement path, which connects some measurement points in a time series, passes through the not-enterable area, those measurement points are considered as being not normal and their position data is corrected such that the movement path circumvents the not-enterable area, as shown in FIGS. 2A-2 to 2E-2, thereby allowing users to easily grasp the behavior of a person.

Although it is assumed, in the present embodiment, that positioning operations are performed at intervals of one second, for example, each interval between positioning operations is not limited to one second.

Figure 3:
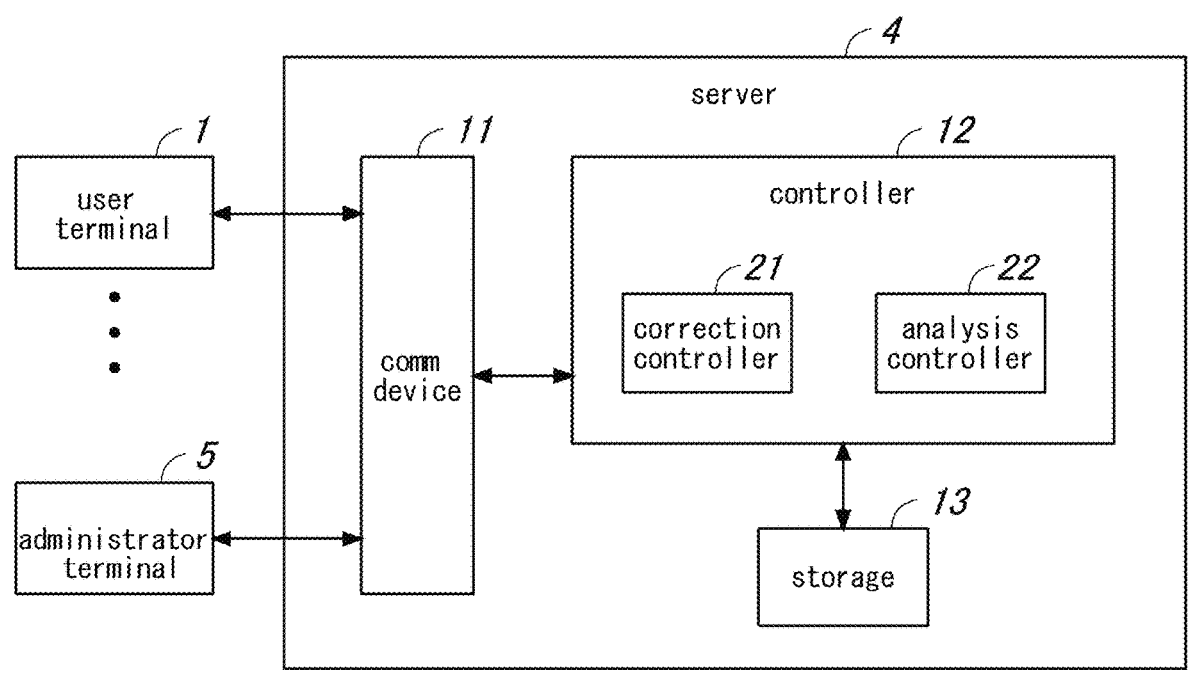
FIG. 3 is a block diagram showing a schematic configuration of a server 4.

Next, a schematic configuration of the server 4 will be described. FIG. 3 is a block diagram showing a schematic configuration of the server 4.

The server 4 includes a communication device 11, a controller 12, and a storage 13.

The communication device 11 is configured to communicate with the user terminal 1 and the administrator terminal 5 via the network.

The storage 13 stores programs executable by a processor, which implements the controller 12. In addition, the storage 13 stores information (e.g. terminal ID, position data, and positioning times) included in a positioning result notification received from the user terminal 1. Moreover, the storage 13 stores not-enterable area information (position data of not-enterable areas) received from the administrator terminal 5.

The controller 12 includes a correction controller 21 and an analysis controller 22. The controller 12 is implemented by the processor, and each unit of the controller 12 is implemented by the processor executing a program stored in the storage 13.

The correction controller 21, based on not-enterable area information, performs correction operations for correcting position data at respective times collected from the user terminal 1 so that a movement path circumvents a not-enterable area.

The analysis controller 22 performs various analysis operations based on position data corrected by the correction controller 21, and generates, e.g., a movement path which connects positions at respective times in a time series.

Figure 4:
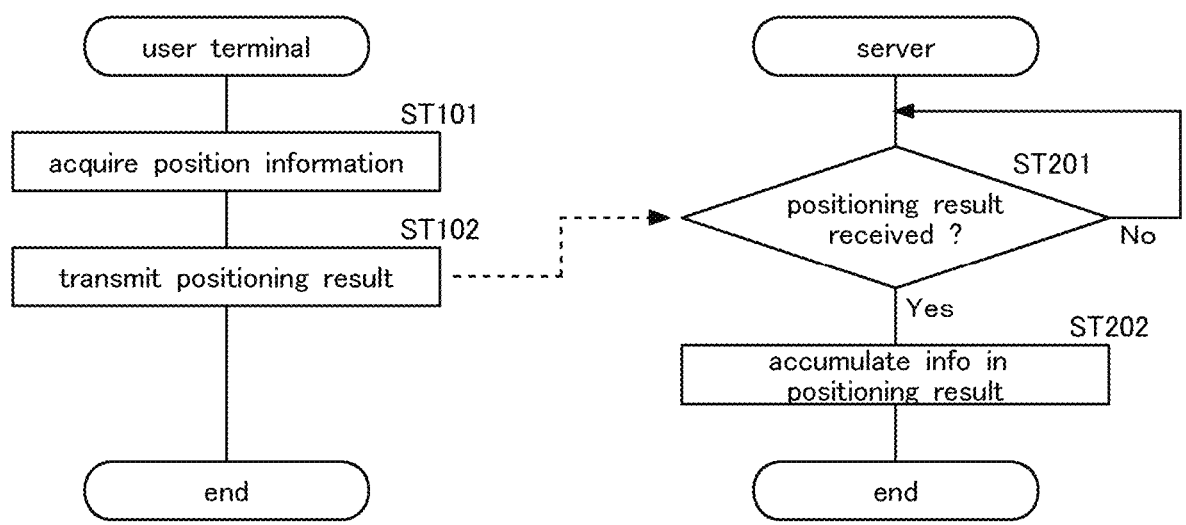
FIG. 4 is a flow chart showing operation procedures of a user terminal 1 and the server 4 when the user terminal 1 transmits position information to the server 4.

Next, operation procedures of the user terminal 1 and the server 4 when the user terminal 1 transmits position information to the server 4 will be described. FIG. 4 is a flow chart showing operation procedures of a user terminal 1 and the server 4 when the user terminal 1 transmits position information to the server 4.

The user terminal 1 acquires position information including position data of the user terminal 1 itself (ST101). Then, the user terminal 1 transmits a positioning result notification including its terminal ID, position data, and positioning times to the server 4 (ST102).

If the communication device 11 of the server 4 receives the positioning result notification transmitted from the user terminal 1 (Yes in ST201), the server 4 stores information included in the positioning result notification (terminal ID, position data, positioning times, and moving distances) in the storage 13 (ST202).

The above operations are repeated periodically at predetermined intervals from the time when the user terminal 1 enters a target area and starts positioning operations until the user terminal 1 exits the target area and ends the positioning operations, and the position data of each time is accumulated in the server 4.

Figure 5:
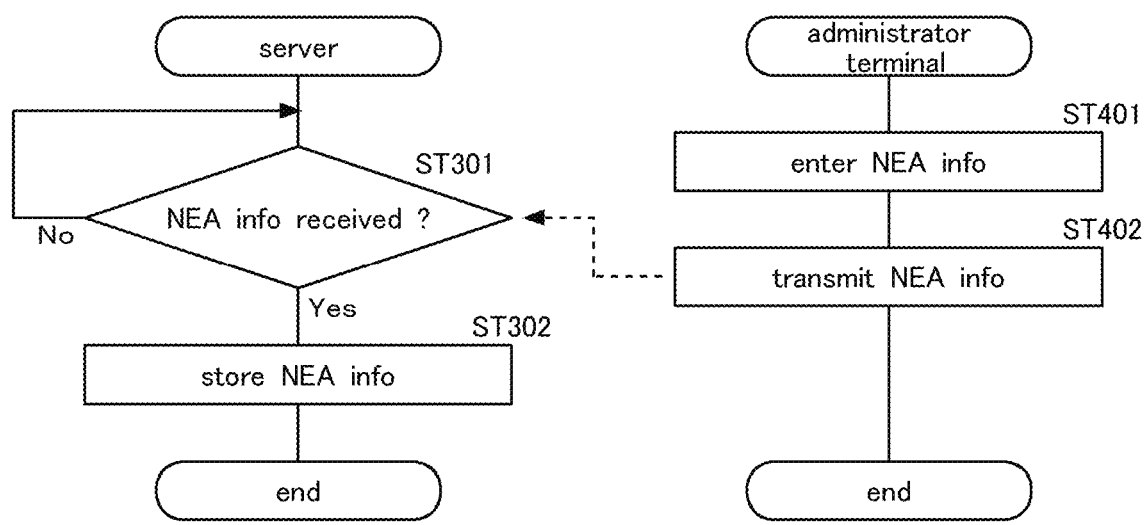
FIG. 5 is a flow chart showing operation procedures of the server 4 and an administrator terminal 5 when a not-enterable area is registered.

Next, operation procedures of the server 4 and the administrator terminal 5 when a not-enterable area is registered will be described. FIG. 5 is a flow chart showing operation procedures of the server 4 and the administrator terminal 5 when a not-enterable area is registered.

In regard to the administrator terminal 5, when the administrator starts a browser, accesses the server 4, and enters not-enterable area (NEA) information (position data of not-enterable areas) (ST401), the administrator terminal 5 transmits the not-enterable area information to the server 4 (ST402).

When the communication device 11 of the server 4 receives the not-enterable area information transmitted from the administrator terminal 5 (Yes in ST301), the server 4 stores the not-enterable area information in the storage 13 (ST302).

In the present embodiment, not-enterable area information is entered when an administrator operates on the administrator terminal 5 to set position data of a not-enterable area based on map information on a target area. However, in other embodiments, the administrator terminal 5 or the server 4 may be configured to detect a not-enterable area from map information (images) and acquire not-enterable area information.

Figure 6:
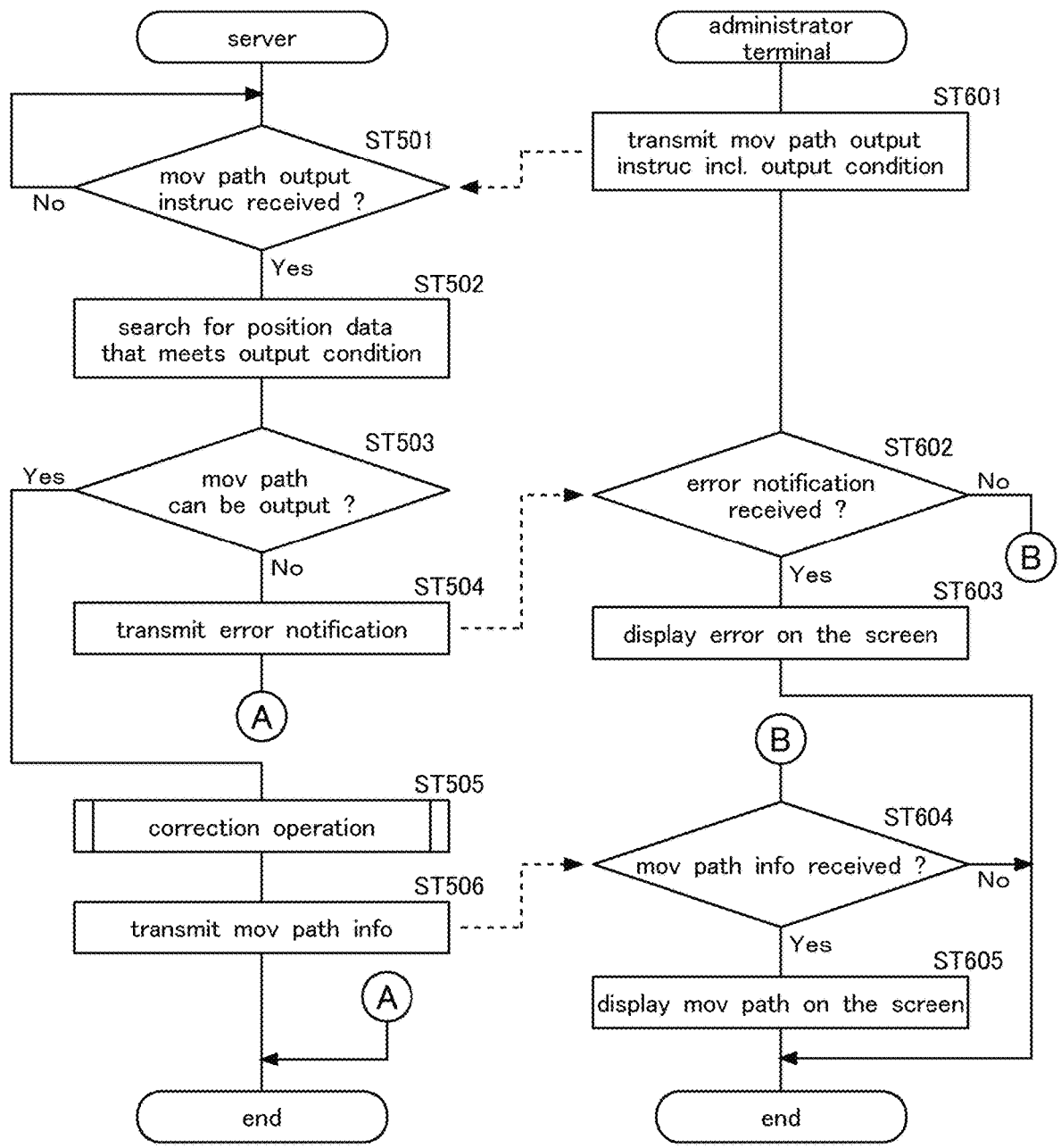
FIG. 6 is a flow chart showing operation procedures of the server 4 and the administrator terminal 5 when a movement path is output.

Next, operation procedures of the server 4 and the administrator terminal 5 when a movement path is output will be described. FIG. 6 is a flow chart showing operation procedures of the server 4 and the administrator terminal 5 when a movement path is output.

When the communication device 11 of the server 4 receives movement path output instructions including a movement path output condition (including target person and time) transmitted from the administrator terminal 5 (Yes in ST501), the server 4 searches the storage 13 for position data corresponding to the output condition (ST502). Then, based on the search result, the server 4 determines whether or not the movement path can be output (ST503). If there is no position data corresponding to the output condition and the movement path cannot be output (No in ST503), the communication device 11 transmits an error notification to the administrator terminal 5 (ST504).

If there is position data corresponding to the output condition and the movement path can be output (Yes in ST503), the correction controller 21 performs a correction operation, that is, when the movement path passes through the not-enterable area, the correction controller 21 performs an operation for correcting the position data such that the movement path circumvents the not-enterable area (ST505).

In regard to the administrator terminal 5, when the administrator starts a browser, accesses the server 4, specifies the output condition (such as target person or time), and instructs the server 4 to output a movement path, the administrator terminal 5 transmits movement path output instructions including the output condition to the server 4 (ST601).

Next, when the administrator terminal 5 receives an error notification that the movement path cannot be output from the server 4 (Yes in ST602), the administrator terminal 5 displays the error notification on a screen (ST603). When the administrator terminal 5 receives movement path information from the server 4 (Yes in ST604), the administrator terminal 5 displays the movement path on the screen based on the movement path information (ST605).

Although, in the present embodiment, the server 4 performs a correction operation when receiving instructions to output a movement path, the time to perform the correction operation is not limited to this. For example, the server 4 may be configured to perform a correction operation at a proper time regardless of whether or not the server 4 receives movement path output instructions. In addition, the server 4 may discard corrected position data after transmitting movement path information responsive to the movement path output instructions, or store corrected position data in storage after transmitting movement path information.

Figure 7:
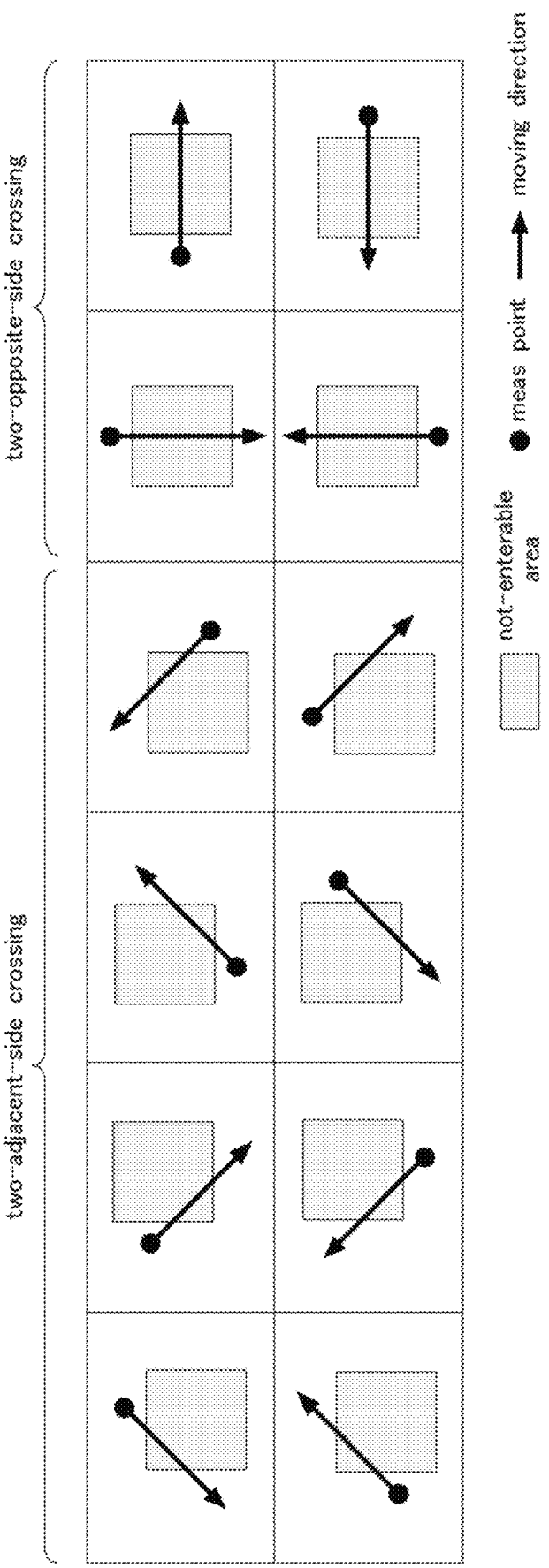
FIG. 7 is an explanatory diagram showing an outline of division into cases based on a crossing status with regard to how a movement path crosses a not-enterable area.
Figure 8:
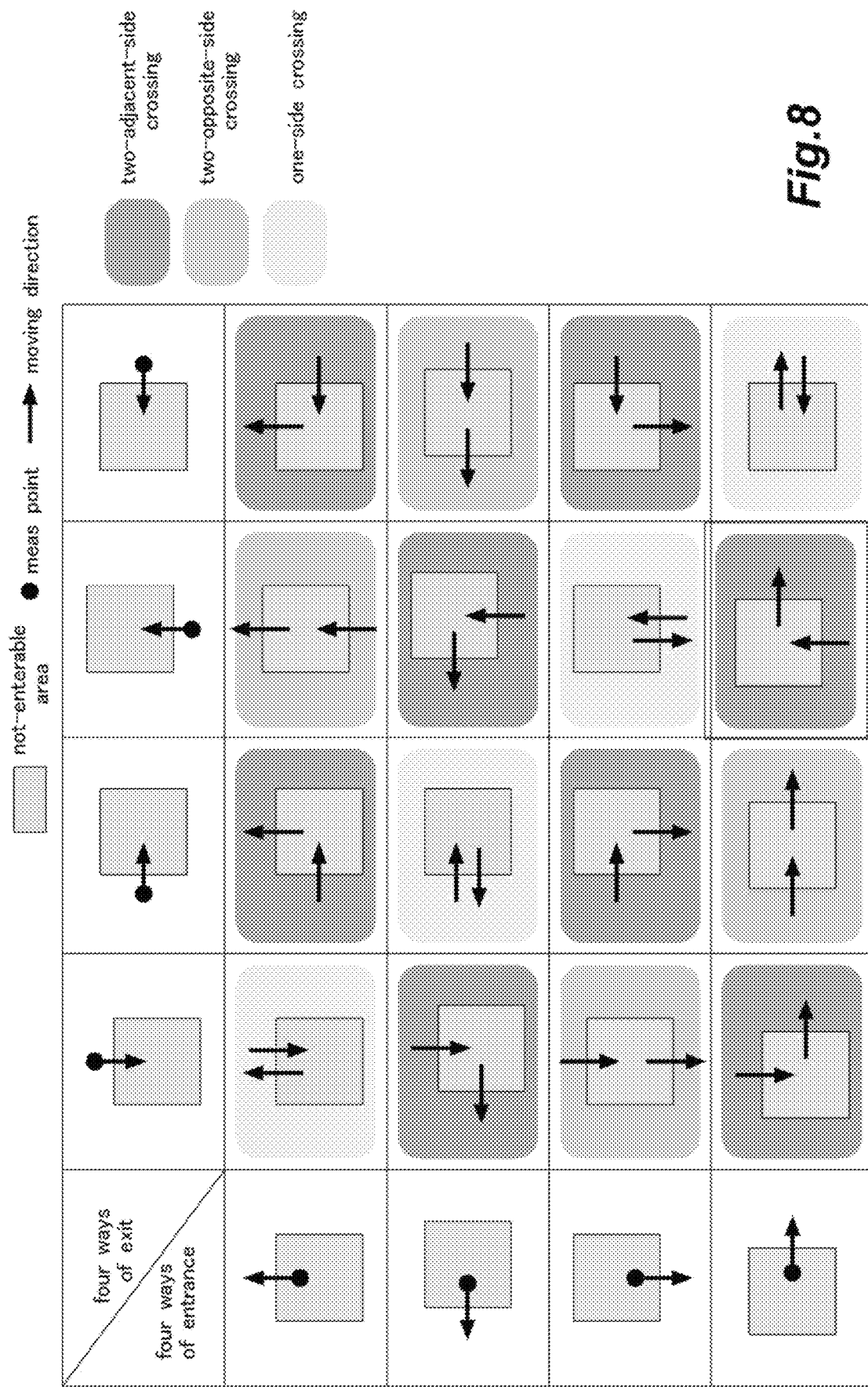
FIG. 8 is an explanatory diagram showing an outline of division into cases based on a crossing status with regard to how a movement path crosses a not-enterable area.

Next, division into cases based on a crossing status with regard to how a movement path crosses a not-enterable area will be described. FIGS. 7 and 8 are explanatory diagrams showing an outline of division into cases based on a crossing status with regard to how a movement path crosses a not-enterable area.

In the present embodiment, the server 4 performs a crossing determination operation; that is, determine whether or not a movement path (line segment) which connects a measurement point P(t) at a certain time (t) and a measurement point P(t−1) at the time (t−1) immediately before (for example, one second before) the time (t), crosses one or more sides of a not-enterable area, and then the server 4 performs a correction operation, using division into cases based on the crossing status regard to how the movement path crosses the not-enterable area.

When there is no measurement point within the not-enterable area and a movement path merely passes through the not-enterable area as shown in FIG. 7, there are 12 crossing statuses in total.

Specifically, the crossing statuses regarding two sides (entrance and exit sides) which the movement path crosses when entering and exit a not-enterable area, respectively, can be divided into the following two cases: one is a case where a movement path passes diagonally through a not-enterable area; that is, a movement path crosses two adjacent sides of a not-enterable area (two-adjacent-side crossing); and the other is a case where a movement path passes straight through a not-enterable area; that is, a movement path crosses two opposite sides of a not-enterable area (two-opposite-side crossing).

When there is one or more measurement points within a not-enterable area as shown in FIG. 8, there are 16 crossing statuses in total regarding the combination of two sides (entrance and exit sides) which the movement path crosses when entering and exit a not-enterable area, respectively. Specifically, there are four cases regarding which side of the four sides of the not-enterable area is an entrance side, and there are four cases regarding which side of the four sides of the not-enterable area is an exit side, and thus there are the 16 combinations of entrance and exit sides.

These crossing statuses regarding the combination of entrance and exit sides can be divided into the following three cases: a first one is a case where a movement path crosses two adjacent sides of a not-enterable area (two-adjacent-side crossing); a second one is a case where a movement path crosses two opposite sides of a not-enterable area (two-opposite-side crossing); and a third one is a case where a movement path enters and exits a not-enterable area crossing the same side; that is, a movement path crosses only one side of a not-enterable area (one-side crossing).

Next, patterns of divided cases for which corresponding correction operations are performed will be described. FIG. 9 is an explanatory diagram showing patterns of divided cases for which corresponding correction operations are performed.

In the present embodiment, the statues regarding measurement points in a not-enterable area are divided into the following three cases: a first one is a case where there is no measurement point in the not-enterable area; a second one is a case where the number of measurement points in the not-enterable area is less than a predetermined threshold value; and a third one is a case where the number of measurement points in the not-enterable area is equal to or greater than the predetermined threshold value.

The threshold value of the numbers of measurement points may be determined as appropriate, but preferably there are four, for example Since positioning operations are performed at consent intervals, the statues regarding measurement points may be divided based on the time period a mobile body has stayed in a not-enterable area. In this case, assuming that positioning operations are performed at intervals of one second, a threshold value of time period a mobile body has stayed in a not-enterable area may be set to be three or four seconds.

In the present embodiment, regarding the crossing statuses with regard to how a movement path (MVH) crosses a not-enterable area (NEA), when there is no measurement point (MP) within the not-enterable area, the crossing statuses are divided into two cases; that is, two-adjacent-side crossing and two-opposite-side crossing, whereas, when one or more measurement points are present within the not-enterable area, the crossing statuses are divided into three cases; that is, two-adjacent-side crossing, two-opposite-side crossing, and one-side crossing (see FIGS. 7 and 8).

In the present embodiment, the patterns of crossing status are divided into eight cases (first to eighth cases) based on the above-described methods of division, and for each pattern, a corresponding correction operation is performed.

Figure 10:
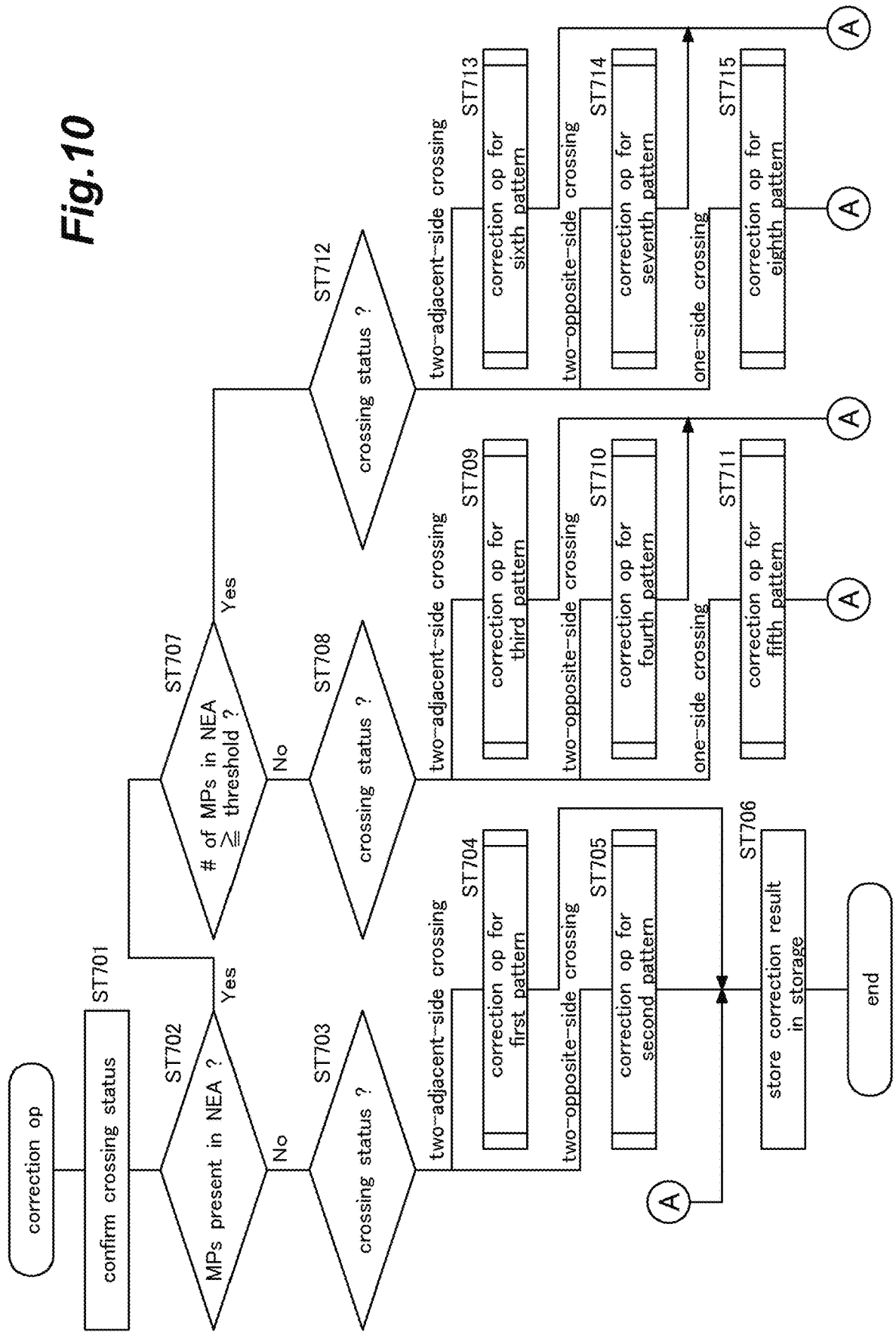
FIG. 10 is a flow chart showing an operation procedure of correction operations performed by a correction controller 21 of the server 4.

Next, an operation procedure of correction operations (ST505 in FIG. 6) performed by the correction controller 21 of the server 4 will be described. FIG. 10 is a flow chart showing an operation procedure of correction operations performed by the correction controller 21.

First, the correction controller 21 of the server 4 confirms a crossing status with regard to how a movement path (line segment) connecting measurement points at respective times crosses the four sides of a not-enterable area (ST701). In this step, the correction controller 21 acquires the coordinate of a point at which the movement path crosses a side of the not-enterable area when entering the not-enterable area (entrance point) and the coordinate of a point at which the movement path crosses a side of the not-enterable area when exiting the not-enterable area (exit point). Next, the correction controller 21 determines whether or not there is a measurement point in the not-enterable area (ST702).

If there is no measurement point in the not-enterable area (No in ST702), the correction controller 21 then determines which crossing status is formed by the crossing between the movement path and the not-enterable area (ST703). If the crossing status is two-adjacent-side crossing, the correction controller 21 performs a correction operation for a first pattern (ST704). If the crossing status is two-opposite-side crossing, the correction controller 21 performs a correction operation for a second pattern (ST705).

Next, the server 4 stores the correction result in the storage 13 (ST706).

If one or more measurement points are present in the not-enterable area (Yes in ST702), the correction controller 21 then determines whether or not the number of measurement points in the not-enterable area is equal to or greater than a predetermined threshold value (for example, three) (ST707).

If the number of measurement points in the not-enterable area is less than the threshold value (No in ST707), the correction controller 21 then determines which crossing status is formed by the crossing between the movement path and the not-enterable area (ST708). If the crossing status is adjacent two-side crossing, the correction controller 21 performs a correction operation for a third pattern (ST709). If the crossing status is two-opposite-side crossing, the correction controller 21 performs a correction operation for a fourth pattern (ST710). If the crossing status is one-side crossing, the correction controller 21 performs a correction operation for a fifth pattern (ST711).

If the number of measurement points in the not-enterable area is equal to or greater than the threshold value (Yes in ST707), the correction controller 21 then determines which crossing status is formed by the crossing between the movement path and the not-enterable area (ST712). If the crossing status is adjacent two-side crossing, the correction controller 21 performs a correction operation for a sixth pattern (ST713). If the crossing status is two-opposite-side crossing, the correction controller 21 performs a correction operation for a seventh pattern (ST714). If the crossing status is one-side crossing, the correction controller 21 performs a correction operation for an eighth pattern (ST715).

Figure 11:
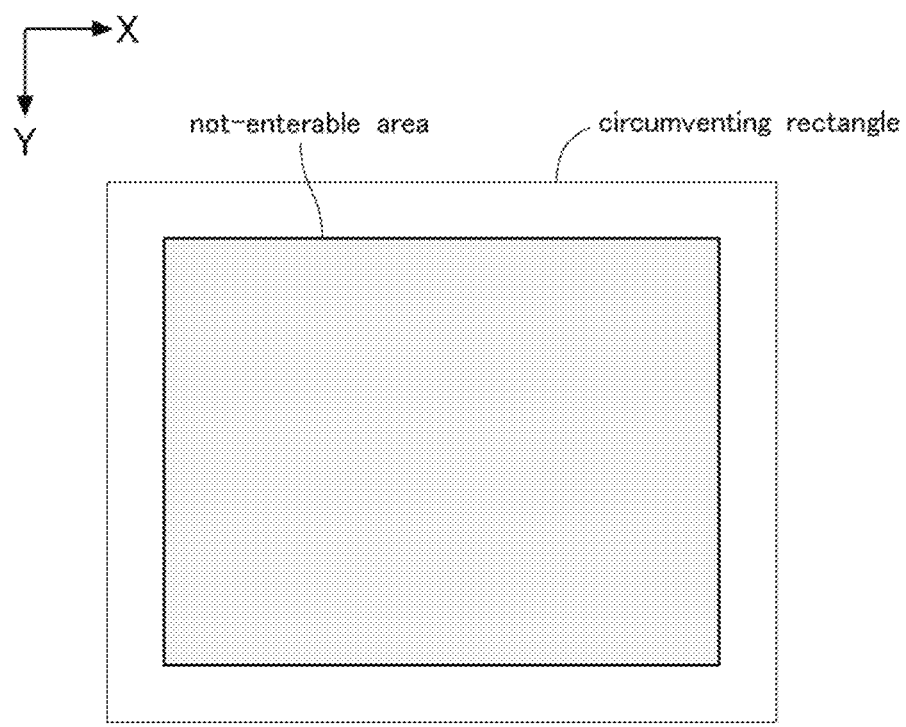
FIG. 11 is an explanatory diagram showing a circumventing rectangle set by the correction controller 21 of the server 4.

Next, a circumventing rectangle set by the correction controller 21 of the server 4. FIG. 11 is an explanatory diagram showing how a circumventing rectangle is set.

In the present embodiment, a circumventing rectangle is set so as to surround a not-enterable area. Each side of the circumventing rectangle is set to be parallel to an X direction (first direction) or a Y direction (second direction) in an XY coordinate system (Cartesian coordinate system). The distance between each side of the not-enterable area and a corresponding side of the circumventing rectangle may be determined as appropriate.

A correction operation corrects positions of measurement points in a not-enterable area, that of a measurement point immediately before a movement path enters the not-enterable area, and that of a measurement point immediately after the movement path exits the not-enterable area, to one or more vertices and one or more sides of a circumventing rectangle. As a result, the movement path passing through the not-enterable area before the correction is corrected so as to circumvent the not-enterable area along the circumventing rectangle.

In some cases, a not-enterable area may be defined as a rectangular area, and a circumventing rectangle having a rectangle shape is formed such that each side of the not-enterable area is separated from a corresponding side of circumventing rectangle by at a predetermined distance. However, in other cases, even if a not-enterable area is not rectangle, a circumventing rectangle can be formed so as to surround the not-enterable area.

Figure 12:
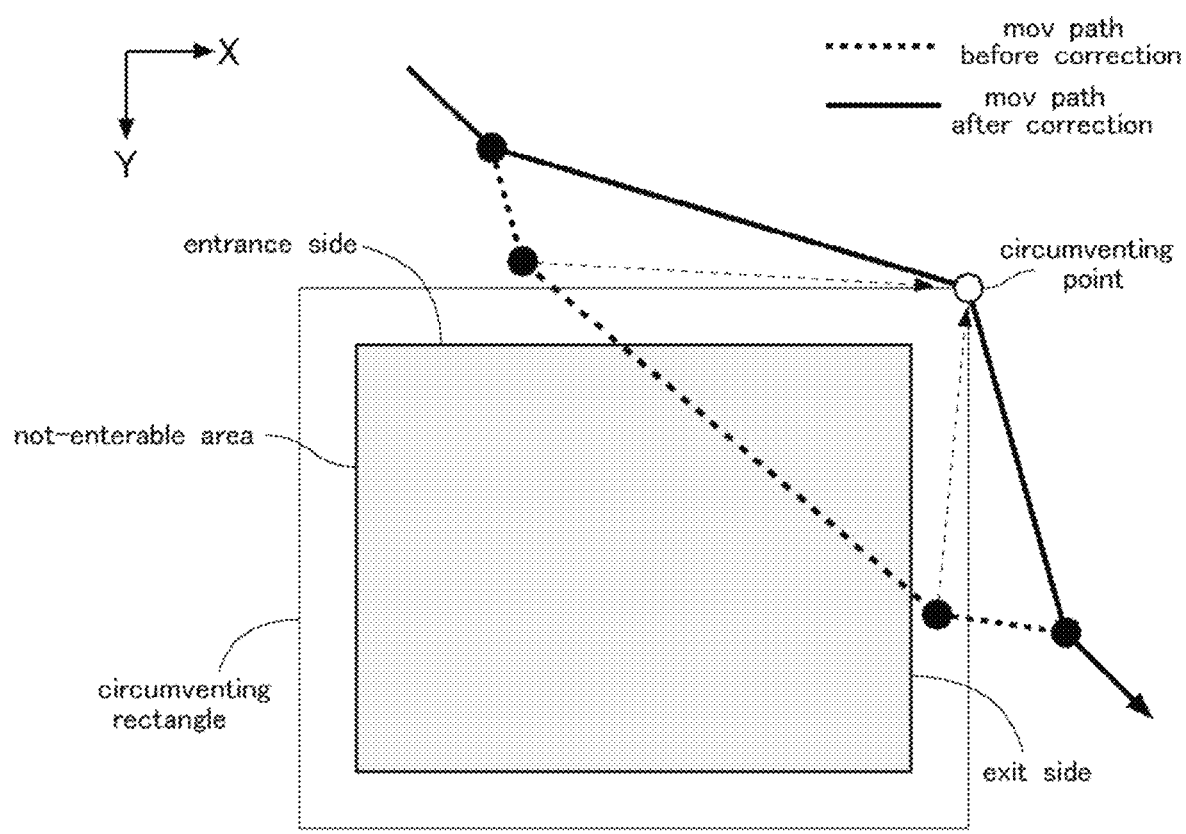
FIG. 12 is an explanatory diagram showing an outline of a correction operation for a first pattern.
Figure 13:
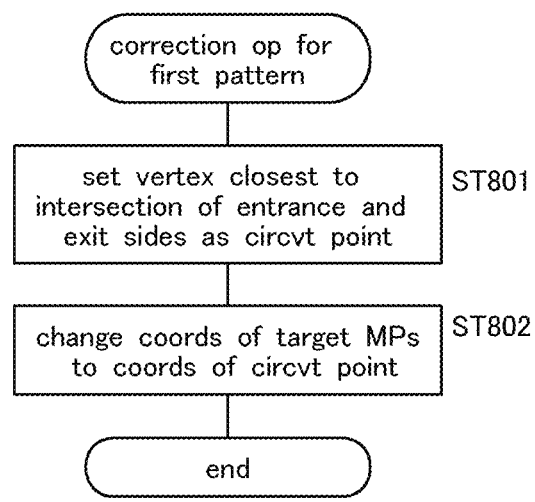
FIG. 13 is a flow chart showing an operation procedure of the correction operation for the first pattern.

Next, a correction operation for the first pattern (ST704 in FIG. 10) will be described. FIG. 12 is an explanatory diagram showing an outline of a correction operation for the first pattern. FIG. 13 is a flow chart showing an operation procedure of the correction operation for the first pattern.

In the case of the first pattern, there is no measurement point in a not-enterable area, and a movement path (line segment) connecting the two measurement points passes diagonally through the not-enterable area; that is, a crossing status in which the movement path crosses two adjacent sides of the not-enterable area (two-adjacent-side crossing) is formed.

For the first pattern, the correction controller 21 first specifies the side of a not-enterable area which a movement path crosses when entering the not-enterable area (entrance side) and the side of the not-enterable area which the movement path crosses when exiting the not-enterable area (exit side), and then sets one vertex of the four vertices of the circumventing rectangle which is closest to the intersection of the entrance side and the exit side as a circumventing point (ST801). Next, the correction controller 21 changes the coordinates of target measurement points; that is, the measurement point immediately before the movement path enters the not-enterable area and the measurement point immediately after the movement path exits the not-enterable area, to the coordinates of the circumventing point (ST802).

Figure 14:
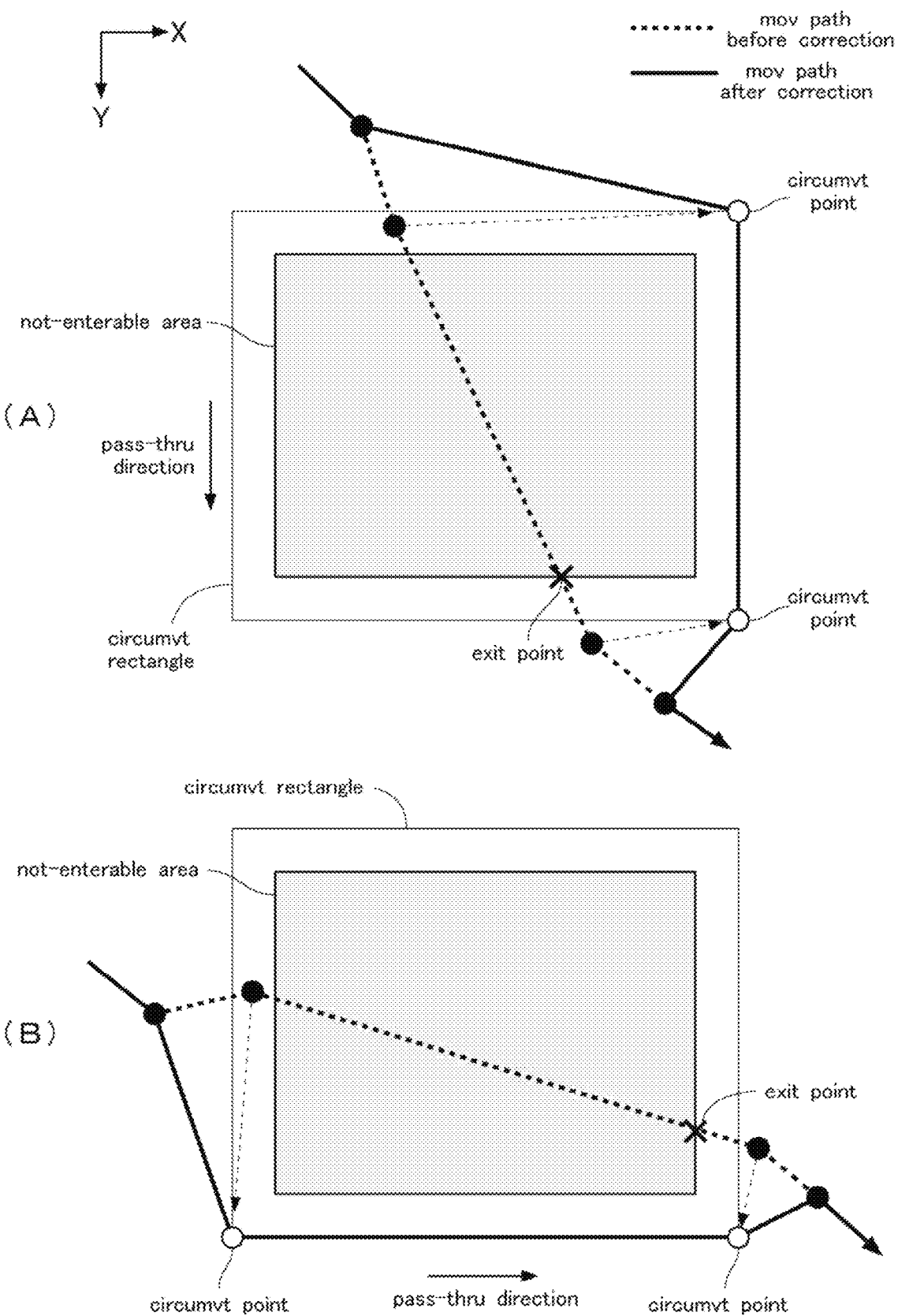
FIG. 14 is an explanatory diagram showing an outline of a correction operation for a second pattern.
Figure 15:
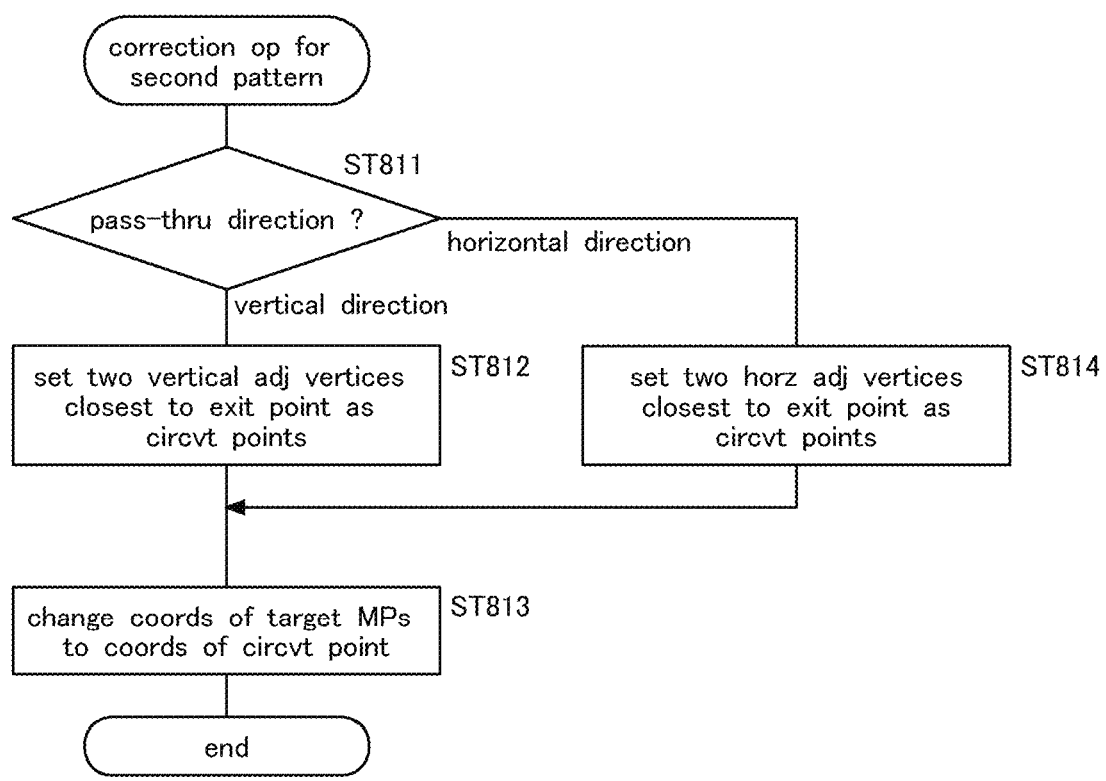
FIG. 15 is a flow chart showing an operation procedure of the correction operation for the second pattern.

Next, a correction operation for the second pattern (ST705 in FIG. 10) will be described. FIG. 14 is an explanatory diagram showing an outline of a correction operation for the second pattern. FIG. 15 is a flow chart showing an operation procedure of the correction operation for the second pattern.

In the case of the second pattern, there is no measurement point in a not-enterable area, and a movement path (line segment) connecting the two measurement points passes straight through the not-enterable area; that is, a crossing status in which the movement path crosses two opposite sides of the not-enterable area (two-opposite-side crossing) is formed.

For the second pattern, the correction controller 21 first determines in which direction the movement path passes through the not-enterable area, the vertical direction (Y direction) or the horizontal direction (X direction) (ST811).

If the movement path passes through the not-enterable area in the vertical direction (Y direction) ("vertical direction" in ST811) as shown in FIG. 14A, the correction controller 21 sets two vertices of the circumventing rectangle as circumventing points; that is, sets a vertex closest to an exit point at which the movement path exits the not-enterable area and its vertically adjacent vertex (adjacent in Y direction) as circumventing points (ST812).

Next, the correction controller 21 changes the coordinates of target measurement points; that is, the measurement point immediately before the movement path enters the not-enterable area and the measurement point immediately after the movement path exits the not-enterable area, to the coordinates of the circumventing points (ST813). Specifically, the coordinates of the measurement points on the entrance and exit sides are changed to those on the entrance-side circumventing point and the exit-side circumventing point, respectively.

If the movement path passes through the not-enterable area in the horizontal direction (X direction) ("horizontal direction" in ST811) as shown in FIG. 14B, the correction controller 21 sets two vertices of the circumventing rectangle as circumventing points; that is, sets a vertex closest to an exit point at which the movement path exits the not-enterable area and its horizontally adjacent vertex (adjacent in Y direction) as circumventing points (ST814). Then, the process proceeds to ST813.

The exit point can be located at the center of a side. In this case, a circumventing point may be determined based on a position of a measurement point immediately after the movement path exits the not-enterable area. When the measurement point immediately after the movement path exits the not-enterable area is still located on the center line, a circumventing point may be determined based on a position of the next measurement point along the movement path. Alternatively, the correction controller 21 may be configured to determine a direction to the destination of a movement path based on how the movement path extends before entering and after exiting the not-enterable area, and set a circumventing point based on the direction to the destination.

Figure 16:
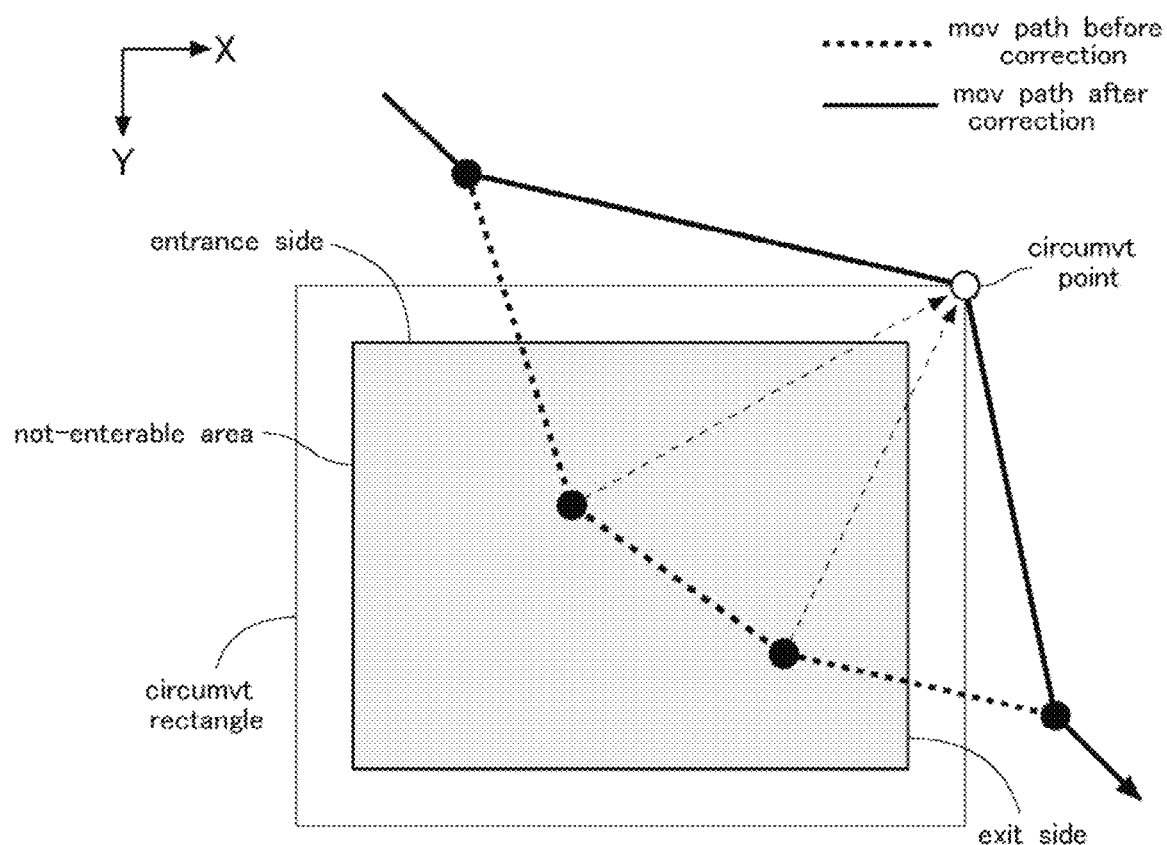
FIG. 16 is an explanatory diagram showing an outline of a correction operation for a third pattern.

Next, a correction operation for the third pattern (ST709 in FIG. 10) will be described. FIG. 16 is an explanatory diagram showing an outline of a correction operation for the third pattern. An operation procedure of the correction operation for the third pattern is the same as that for the first pattern (see FIG. 13).

In the case of the third pattern, the number of measurement points within a not-enterable area is less than a threshold value, and a movement path passes diagonally through the not-enterable area; that is, a crossing status in which the movement path crosses two adjacent sides of the not-enterable area (two-adjacent-side crossing) is formed.

For the third pattern, the correction controller 21 first sets a vertex of the four vertices of the circumventing rectangle which is closest to the intersection of the entrance side and the exit side as a circumventing point (ST801). Next, the correction controller 21 changes the coordinates of target measurement points i.e., the measurement points within the not-enterable area, to the coordinates of the circumventing point (ST802). The correction controller 21 may also change the coordinates of the measurement point immediately before the movement path enters the not-enterable area and the measurement point immediately after the movement path exits the not-enterable area, to the coordinates of the circumventing point.

Figure 17:
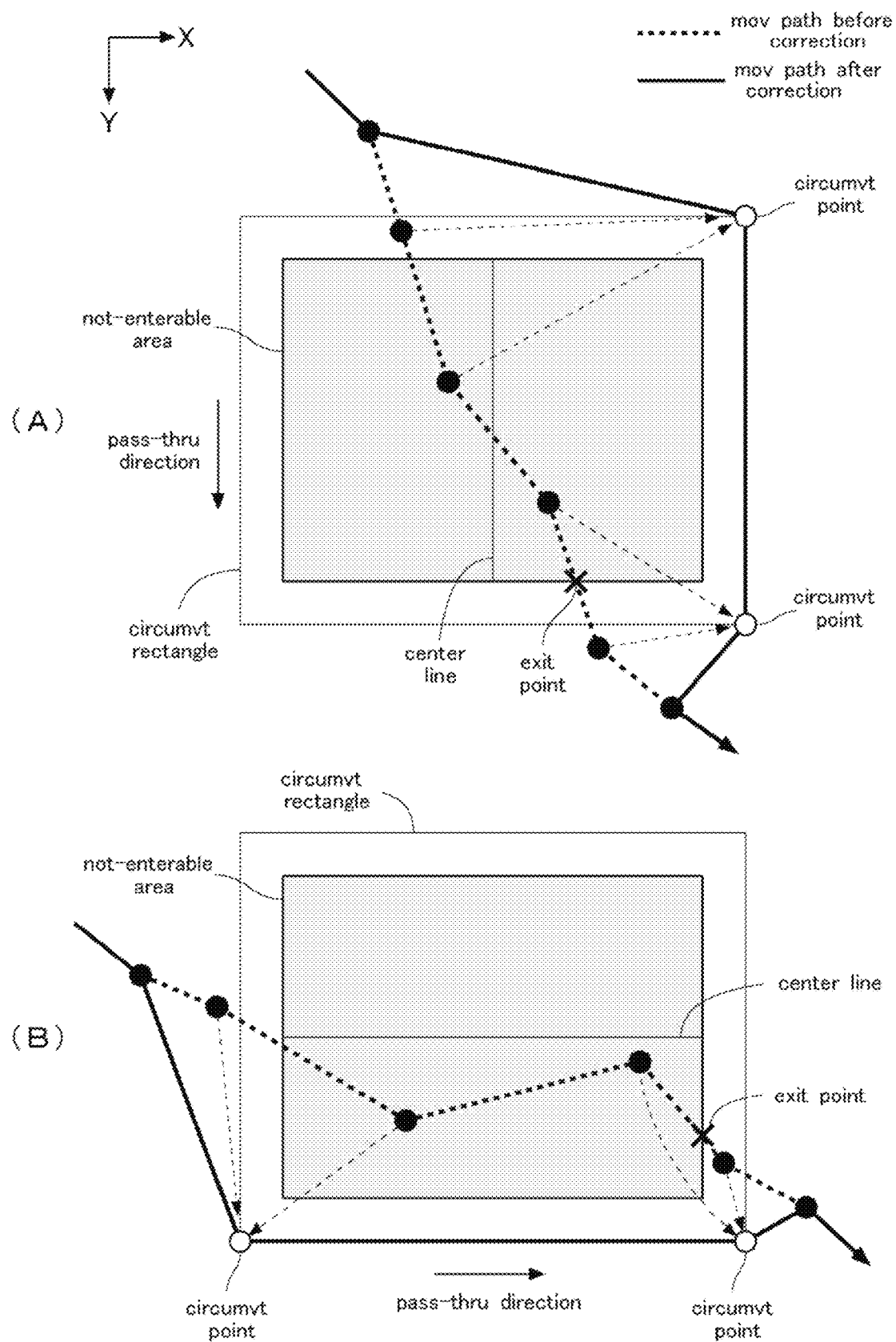
FIG. 17 is an explanatory diagram showing an outline of a correction operation for a fourth pattern.
Figure 18:
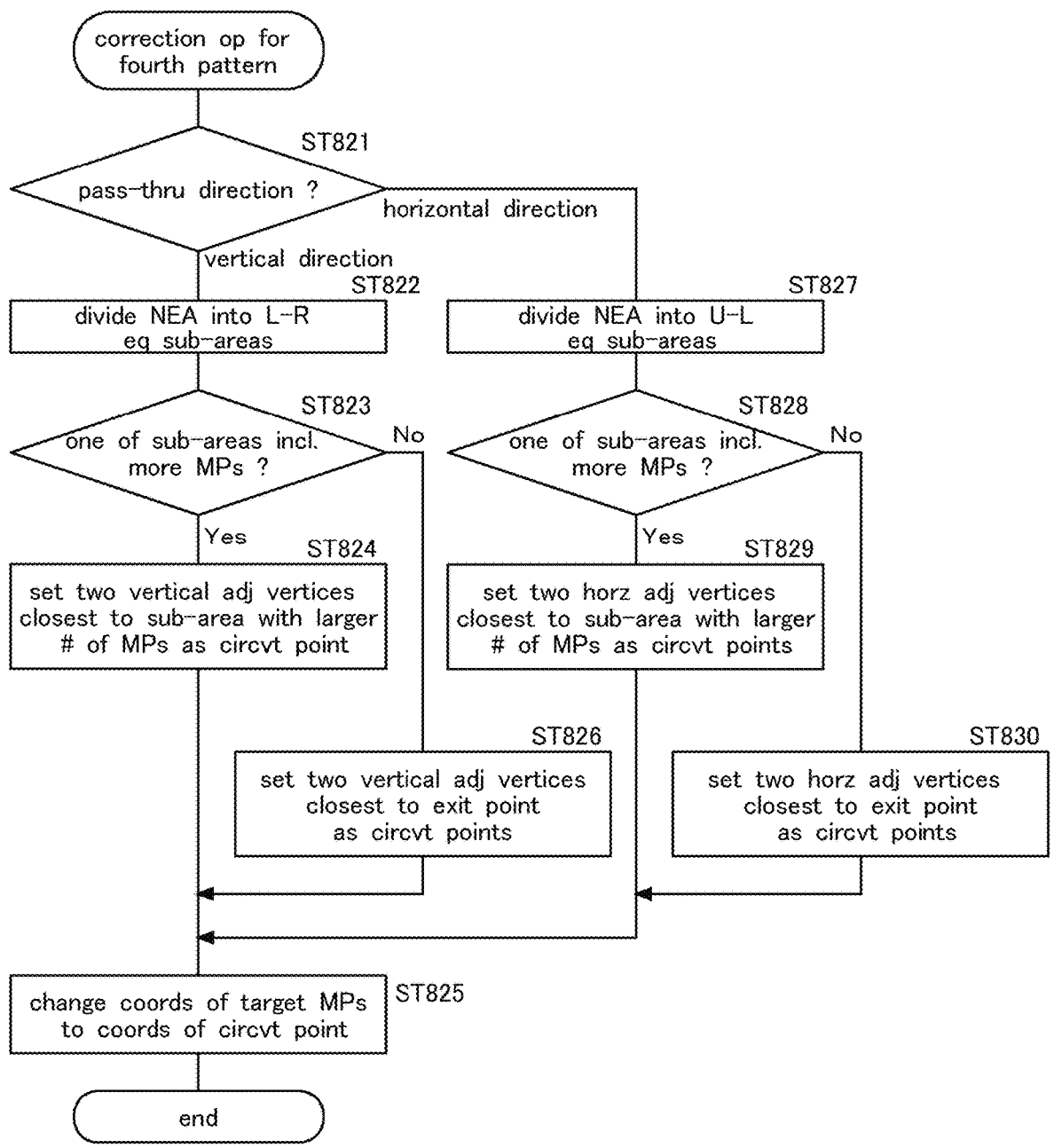
FIG. 18 is a flow chart showing an operation procedure of the correction operation for the fourth pattern.

Next, a correction operation for the fourth pattern (ST710 in FIG. 10) will be described. FIG. 17 is an explanatory diagram showing an outline of a correction operation for the fourth pattern. FIG. 18 is a flow chart showing an operation procedure of the correction operation for the fourth pattern.

In the case of the fourth pattern, the number of measurement points within a not-enterable area is less than a threshold value, and a movement path passes straight through the not-enterable area; that is, a crossing status in which the movement path crosses two opposite sides of the not-enterable area (two-opposite-side crossing) is formed.

For the fourth pattern, the correction controller 21 first determines in which direction the movement path passes through the not-enterable area, the vertical direction (Y direction) or the horizontal direction (X direction) (ST821).

If the movement path passes through the not-enterable area in the vertical direction (Y direction) ("vertical direction" in ST821) as shown in FIG. 17A, the correction controller 21 divides the not-enterable area into left and right equal parts (ST822); that is, divides the not-enterable area into left and right sub-areas by a center line parallel to the passing-through direction (Y direction). Then, the correction controller 21 counts respective numbers of the measurement points within the two sub-areas, and then determines whether or not one of the sub-areas includes more measurement points than the other (ST823).

If one of the sub-areas includes more measurement points than the other (Yes in ST823), the correction controller 21 sets two vertices close to the sub-area including more measurement points as circumventing points (ST824).

Next, the correction controller 21 changes the coordinates of the measurement points within the not-enterable area, the measurement point immediately before the movement path enters the not-enterable area, and the measurement point immediately after the movement path exits the not-enterable area, to the coordinates of the circumventing points (ST825). Specifically, the coordinates of (i) the measurement points within the not-enterable area and close to the entrance point and (ii) the measurement point immediately before the movement path enters the not-enterable area are changed to those of the circumventing point on the entrance side, whereas the coordinates of (i) the measurement points within the not-enterable area and close to the exit point and (ii) the measurement point immediately after the movement path exits the not-enterable area are changed to those of the circumventing point on the exit side.

If the respective numbers of measurement points within the sub-areas are equal to each other as in the example of FIG. 17A (No in ST823), the correction controller 21 sets a vertex of the circumventing rectangle which is closest to the exit point and its vertically adjacent vertex (adjacent in Y direction) as circumventing points (ST826). Then, the process proceeds to ST825.

If the movement path passes through the not-enterable area in the horizontal direction (X direction) ("horizontal direction" in ST821) as shown in FIG. 17B, the correction controller 21 divides the not-enterable area into upper and lower equal parts (ST827); that is, divides the not-enterable area into upper and lower sub-areas by a center line parallel to the passing-through direction (X direction). Then, the correction controller 21 counts respective numbers of the measurement points within the two sub-areas, and then determines whether or not one of the sub-areas includes more measurement points than the other (ST828).

If one of the sub-areas includes more measurement points than the other as shown in FIG. 17B (Yes in ST828), the correction controller 21 sets two vertices close to the sub-area including more measurement points as circumventing points (ST829). Then, the process proceeds to ST825.

If the respective numbers of measurement points within the sub-areas are equal to each other (No in ST828), the correction controller 21 sets a vertex of the circumventing rectangle which is closest to the exit point and its horizontally adjacent vertex (adjacent in X direction) as circumventing points (ST880). Then, the process proceeds to ST825.

When determining a circumventing path based on the exit point (ST826, ST830), the correction controller 21 sometimes cannot determine a side of the circumventing rectangle close to the exit point because the exit point is located on the center line of the not-enterable area in the horizontal or vertical direction. In this case, a circumventing path may be determined based on a position of a measurement point immediately after the movement path exits the not-enterable area. When the measurement point immediately after the movement path exits the not-enterable area is still located on the center line, a circumventing path may be determined based on a position of the next measurement point along the movement path. Alternatively, the correction controller 21 may be configured to determine a direction to the destination of a movement path based on how the movement path extends before entering and after exiting the not-enterable area, and determine a circumventing path based on the direction to the destination.

Figure 19:
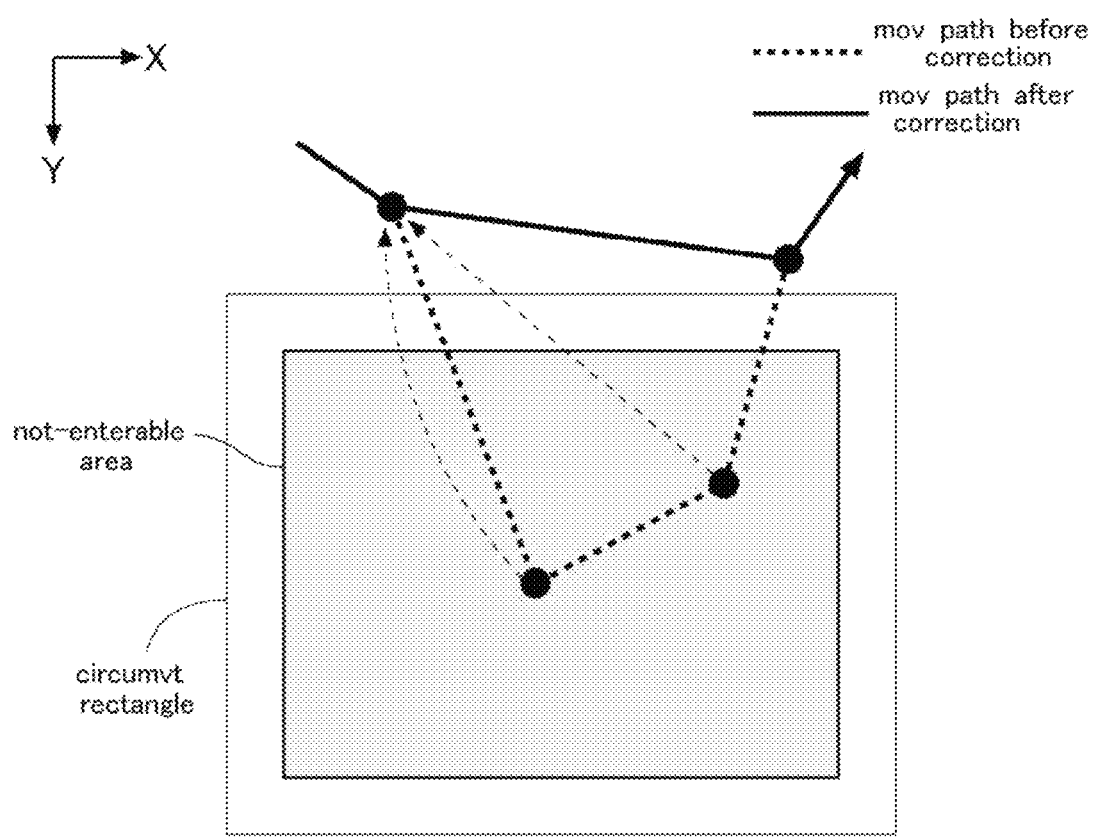
FIG. 19 is an explanatory diagram showing an outline of a correction operation for a fifth pattern.
Figure 20:
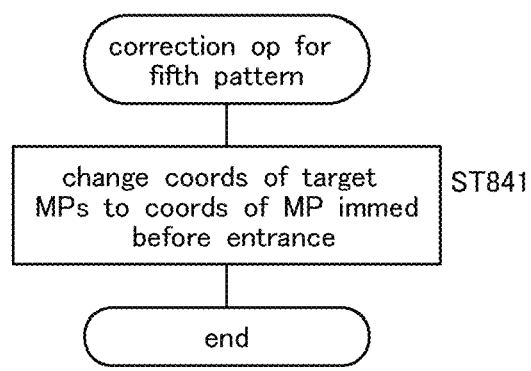
FIG. 20 is a flow chart showing an operation procedure of the correction operation for the fifth pattern.

Next, a correction operation for the fifth pattern (ST711 in FIG. 10) will be described. FIG. 19 is an explanatory diagram showing an outline of a correction operation for the fifth pattern. FIG. 20 is a flow chart showing an operation procedure of the correction operation for the fifth pattern.

In the case of the fifth pattern, the number of measurement points within a not-enterable area is less than a threshold value, and a movement path crossing the same side when both entering and exiting the not-enterable area; that is, a crossing status in which the movement path crosses only one side of the not-enterable area (one-side crossing) is formed.

In this case, the correction controller 21 changes the coordinates of target measurement points, i.e., the measurement points within the not-enterable area, to the coordinates of the measurement point immediately before the movement path enters the not-enterable area (ST841).

Figure 21:
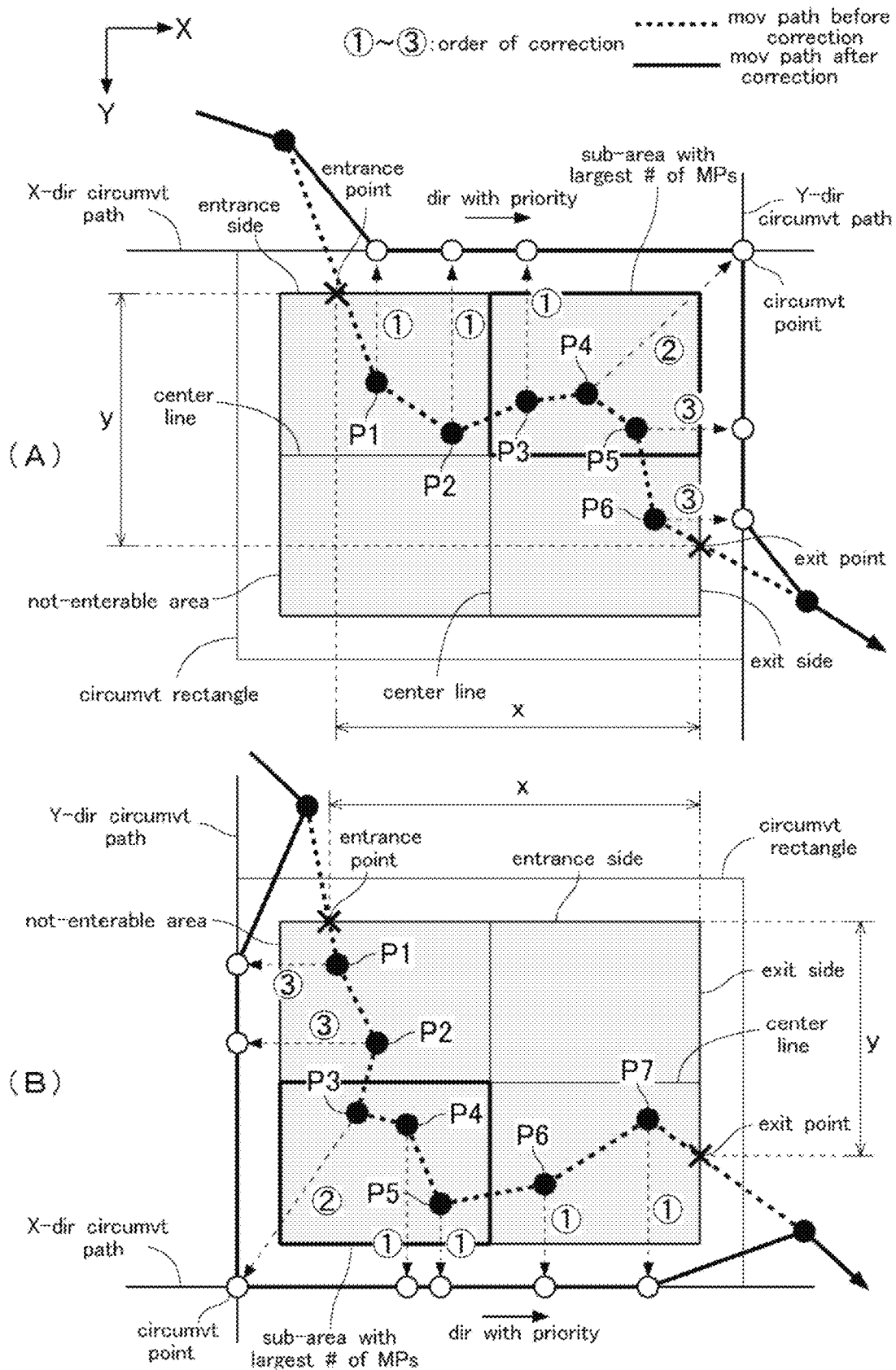
FIG. 21 is an explanatory diagram showing an outline of correction operations for a sixth pattern.
Figure 22:
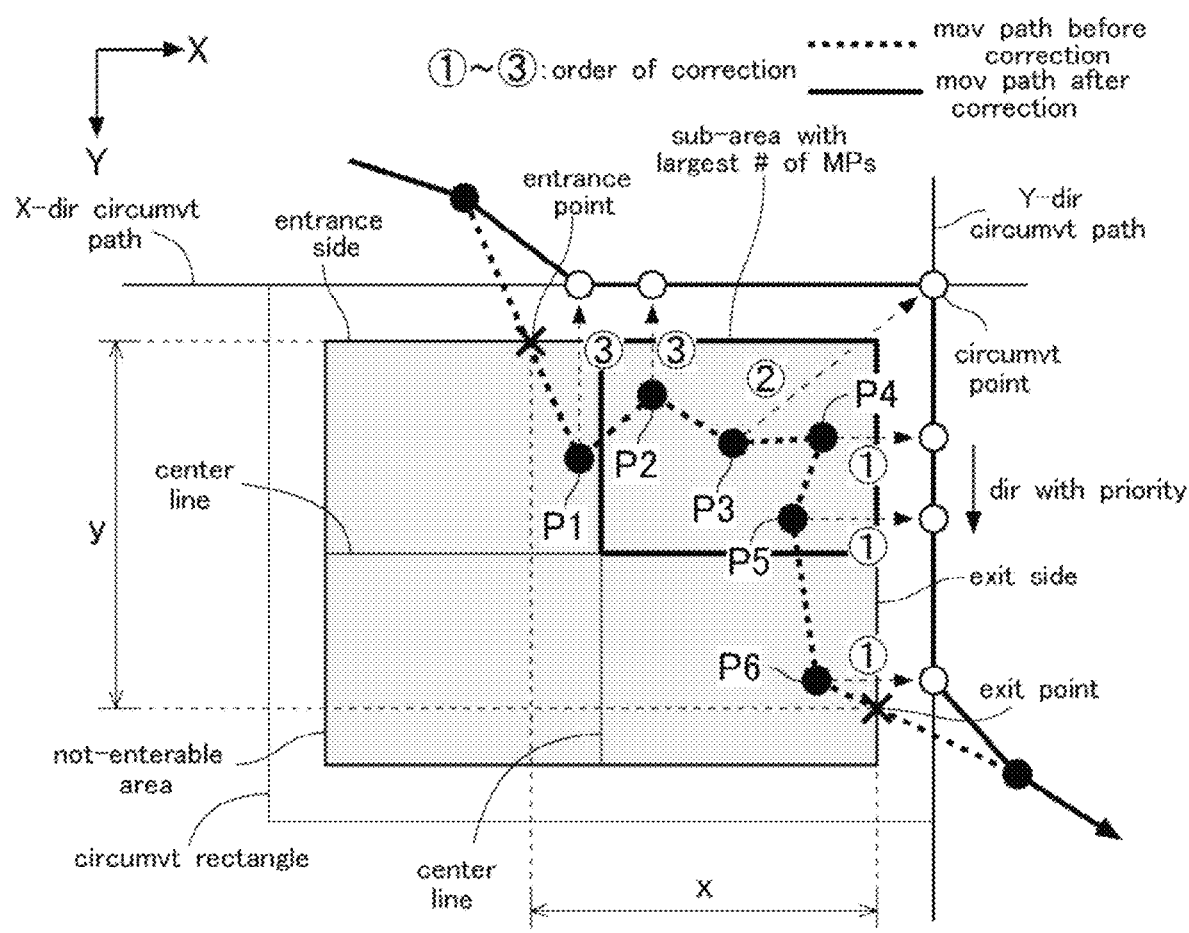
FIG. 22 is an explanatory diagram showing an outline of a correction operation for the sixth pattern.
Figure 23:
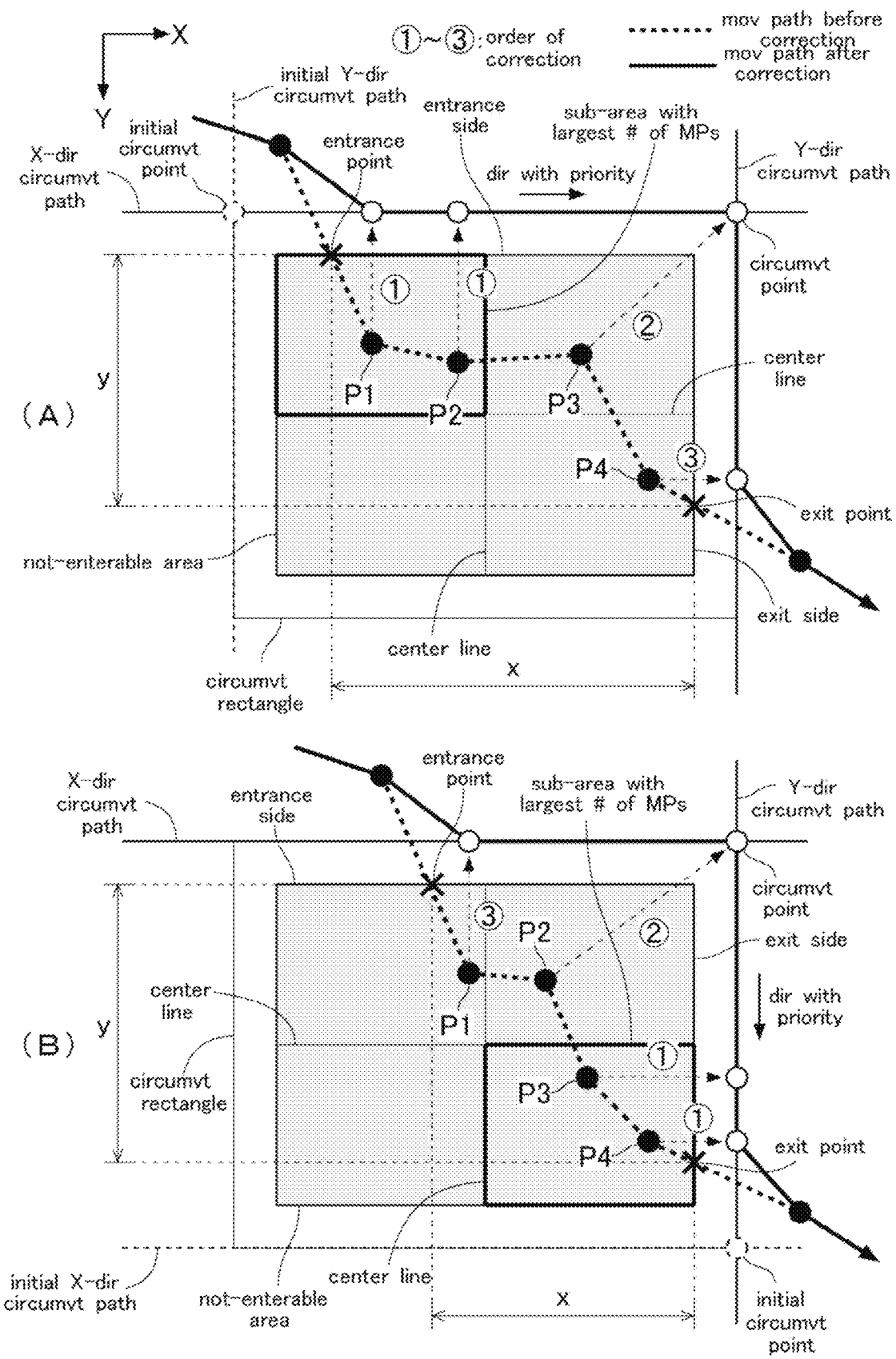
FIG. 23 is an explanatory diagram showing an outline of correction operations for the sixth pattern.
Figure 24:
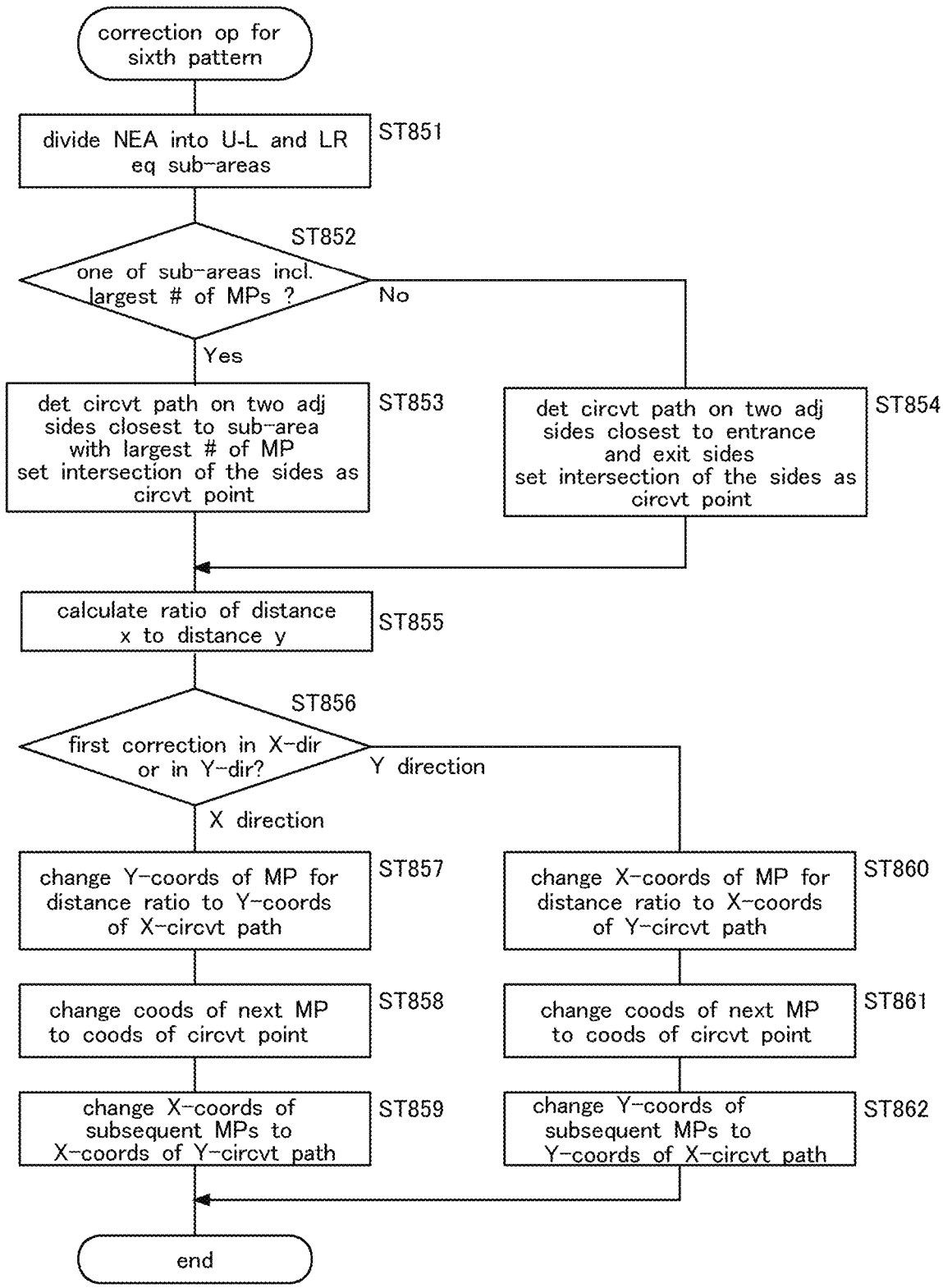
FIG. 24 is a flow chart showing an operation procedure of the correction operation for the sixth pattern.

Next, a correction operation for the sixth pattern (ST713 in FIG. 10) will be described. FIGS. 21, 22 and 23 are explanatory diagrams each showing an outline of correction operations for the sixth pattern. FIG. 24 is a flow chart showing an operation procedure of the correction operations for the sixth pattern.

In the case of the sixth pattern, the number of measurement points within a not-enterable area is equal to or greater than a threshold value, and a movement path passes diagonally through the not-enterable area; that is, a crossing status in which the movement path crosses two adjacent sides of the not-enterable area (two-adjacent-side crossing) is formed.

For the sixth patter, the correction controller 21 divides the not-enterable area into four equal parts, i.e., upper, lower, left, and right equal parts (ST851); that is, the not-enterable area is divided into upper, lower, left, and right sub-areas by a center line in the vertical direction (Y direction) and a center line in the horizontal direction (X direction).

Next, the correction controller 21 counts respective numbers of the measurement points within the four sub-areas to determine whether or not one of the four sub-areas includes more measurement points than any of the other sub-areas (ST852).

If one of the sub-areas includes more measurement points than any of the other sub-areas (Yes in ST852), the correction controller 21 determines a circumventing path on two sides of a circumventing rectangle close to the sub-area with the largest number of measurement points, and sets an intersection of the two sides as a circumventing point (ST853). In the example shown in FIG. 21A, as the upper right sub-area includes more measurement points than any of the other sub-areas, the correction controller 21 determines a circumventing path on the upper and right sides of the circumventing rectangle. In the example shown in FIG. 21B, as the lower left sub-area includes more measurement points than any of the other sub-areas, the correction controller 21 determines a circumventing path on the lower and left sides of the circumventing rectangle.

Next, the correction controller 21 determines the movement distances x and y in the X and Y directions of the movement between the entrance point and the exit point, respectively, based on the coordinates of the entrance point and the exit point, and then calculates the movement ratio (x:y) of the movement distance x to the movement distance y (ST855). Then, the correction controller 21 determines in which direction the correction controller 21 performs a correction operation first (with priority) based on the movement ratio (x:y) of the distance x in the X direction to the distance y in the Y direction (ST856).

In the example shown in FIGS. 21A and 21B, as the movement distance x in the X direction is longer than the moving distance y in the Y direction, the correction controller 21 first performs the correction operation in the X direction (by shifting the coordinates of the measurement points to positions on a circumventing path extending in the X-direction). In the example shown in FIG. 22, as the movement distance y in the Y direction is longer than the movement distance x in the X direction, the correction controller 21 first performs the correction operation in the Y direction (by shifting the coordinates of the measurement points to positions on a circumventing path extending in the Y-direction).

When performing the correction operation in the X direction first ("X direction" in ST856), the correction controller 21 chooses some of the measurement points within the not-enterable area such that the number of the chosen measurement points corresponds to the movement ratio (x:y), and changes the Y coordinates of the chosen measurement point to the Y coordinate of the circumventing path extending in the X-direction (ST857). Then, the correction controller 21 changes the coordinates of the next measurement point along the movement path to those of the circumventing point (ST858). Next, the correction controller 21 changes the X coordinates of the remaining measurement points along the movement path to the X coordinate of the circumventing path extending in the Y-direction (ST859).

In this case, the correction controller 21 determines on which circumventing path the correction operation is performed with priority, the circumventing path extending along a line on the entrance side or that on the exit side of the not-enterable area. If the circumventing path to which priority is given is one extending along a line on the entrance side, a certain number of measurement points are chosen in sequence from the first target measurement point on the entrance side such that the number of the measurement points corresponds to the movement ratio (x:y). If the circumventing path to which priority is given is one extending along a line on the exit side, a certain number of measurement points are chosen in sequence from the first target measurement point on the exit side such that the number of the measurement points corresponds to the movement ratio (x:y).

In the example shown in FIG. 21A, priority is given to the circumventing path extending in the X-direction on the entrance side. Thus, since the movement ratio of the X-direction distance to Y-direction distance is 3:2 (x:y=3:2) and there are six measurement points within the not-enterable area, three measurement points P1, P2, and P3 on the entrance side are chosen as target measurement points, on which the correction operation is performed in the X direction by changing the positions of the three points P1, P2, and P3 to those on the circumventing path extending in the X-direction. Then, the position of the next measurement point P4 is changed to that of the circumventing point. Next, the positions of the remaining two measurement points P5, P6 are changed to those on the circumventing path extending in the Y-direction.

In the example shown in FIG. 21B, priority is given to the circumventing path extending in the Y-direction on the exit side. Thus, since the movement ratio of the X-direction distance to Y-direction distance is 4:2 (x:y=42) and there are seven measurement points within the not-enterable area, three measurement points P4, P5, P6, and P7 on the exit side are chosen as target measurement points, on which the correction operation is performed in the X direction by changing the positions of the four points P4, P5, P6, and P7 to those on the circumventing path extending in the X-direction. Then, the position of the next measurement point P3 is changed to that of the circumventing point. Next, the positions of the remaining two measurement points P1, P2 are changed to those on the circumventing path extending in the Y-direction.

When the correction operation is performing in the Y direction first ("Y direction" in ST856), the correction controller 21 chooses a certain number of the measurement points within the not-enterable area such that the number of the chosen measurement points corresponds to the movement ratio (x:y), and changes the X coordinates of the chosen measurement points to the X coordinate of the circumventing path extending in the Y-direction (ST860). Then, the correction controller 21 changes the coordinates of the next measurement point along the movement path to those of the circumventing point (ST861). Next, the correction controller 21 changes the Y coordinates of the remaining measurement points along the movement path to the Y coordinate of the circumventing path extending in the X-direction (ST862).

In the example shown in FIG. 22, priority is given to the circumventing path extending in the Y-direction on the exit side. Thus, since the movement ratio of the X-direction distance to Y-direction distance is 2:3 (x:y=2:3) and there are six measurement points within the not-enterable area, three measurement points P4, P5, and P6 on the exit side are chosen as target measurement points, on which the correction operation is performed in the Y direction by changing the positions of the four points P4, P5, and P6 to those on the circumventing path extending in the Y-direction. Then, the position of the next measurement point P3 is changed to that of the circumventing point. Next, the positions of the remaining two measurement points P1, P2 are changed to those on the circumventing path extending in the X-direction.

In the examples shown in FIGS. 21A, 21B and 22, the sub-area with the largest number of measurement points extends to both the entrance side and the exit side. However, in some case, the sub-area with the largest number of measurement points does not extend to one of the entrance side and the exit side as shown in FIGS. 23A and 23B. In the example shown in FIG. 23A, the upper left sub-area with the largest number of measurement points extends to the entrance side, but does not extend to the exit side. In the example shown in FIG. 23B, the lower right sub-area with the largest number of measurement points extends to the exit side, but does not extend to the entrance side. In these cases, if, in ST853, the positions of some measurement points are corrected to those on the initial circumventing point and the initial circumventing path, the corrected movement path may cross the not-enterable area. Thus, in the present embodiment, a correction operation by which positions of measurement points are changed to those the circumventing path extending along one line with priority, is performed in the same manner as the above examples, whereas, a correction operation by which positions of measurement points would be otherwise changed to those of the circumventing point and the other circumventing path which are initially set, is performed after the positions of the initial circumventing point and the initial circumventing path are changed to those of a vertex and a side on the opposite side of the not-enterable area.

In the example shown in FIG. 23A, priority is given to the circumventing path extending in the X-direction on the entrance side. Thus, since the movement ratio of the X-direction distance to Y-direction distance is 2:1 (x:y=2:1) and there are four measurement points within the not-enterable area, two first measurement points P1 and P2 on the entrance side are chosen as target measurement points, on which the correction operation is performed in the X direction by changing the positions of the two points P1 and P2 to those on the circumventing path extending in the X-direction. In the next correction operation, the position of the next measurement point P3 is changed to that of the circumventing point, and the position of the remaining measurement point P4 would be otherwise changed to that on the circumventing path extending in the Y-direction. However, if the next correction operation was performed in this way by using the initial circumventing point and the initial circumventing path, the resultant circumventing path would cross the non-enterable area. Thus, in this case, the next operation is performed after the positions of the initial circumventing point and the initial circumventing path extending in the Y direction are changed to those of a vertex and a side on the opposite side of the not-enterable area.

In the example shown in FIG. 23B, priority is given to the circumventing path extending in the Y-direction on the exit side. Thus, since t the movement ratio of the X-direction distance to Y-direction distance is 1:2 (x:y=1:2) and there are four measurement points within the not-enterable area, two first measurement points P3 and P4 on the exit side are chosen as target measurement points, on which the correction operation is performed in the Y direction by changing the positions of the two points P3 and P4 to those on the circumventing path extending in the Y-direction. In the next correction operation, the position of the next measurement point P2 is changed to that of the circumventing point, and the position of the remaining measurement point P1 would be otherwise changed to that on the circumventing path extending in the X-direction. However, if the next correction operation was performed in this way by using the initial circumventing point and the initial circumventing path, the resultant circumventing path would cross the non-enterable area. Thus, in this case, the next operation is performed after the positions of the initial circumventing point and the initial circumventing path extending in the X direction are changed to those of a vertex and a side on the opposite side of the not-enterable area.

If there are two or more sub-areas with the largest number of measurement points (No in ST852), the correction controller 21 determines a circumventing path on two sides of the circumventing rectangle close to the exit side and the entrance side of the not-enterable area, respectively, and sets an intersection of the two sides as a circumventing point (ST854). Then, the process proceeds to ST855.

As described above, in the case of the sixth pattern, as a circumventing path is determined on a side close to the sub-area with the largest number of measurement points, the determined circumventing path is not always the shortest circumventing path. In the example shown in FIG. 21B, as the entrance point is located on the upper side of the not-enterable area and the exit point is located on the right side of the not-enterable area, the shortest circumventing path consists of the upper side and the right side of the circumventing rectangle. However, the determined circumventing path consists of the left side and the lower side of the circumventing rectangle.

Moreover, in the case of the sixth pattern, the correction controller 21 determines the respective numbers of measurement points to be shifted to two parts of the circumventing path extending in the X-direction in the Y-direction, based on the ratio of the movement distance x in the X direction to the movement distance y in the Y direction. In the examples shown in FIGS. 21A and 21B, as the movement distance x is longer than the movement distance y, the number of measurement points to be shifted to the X-direction part of the circumventing path is greater than that of measurement points to be shifted to the Y-direction part of the circumventing path. In the example shown in FIG. 22, as the movement distance y is longer than the movement distance x, the number of measurement points to be shifted to the Y-direction part of the circumventing path is greater than that of measurement points to be shifted to the X-direction part of the circumventing path. In this way, the measurement points within the not-enterable area are assigned to the positions on the X-direction part and the Y-direction part of the circumventing path such that the assigned positions on the circumventing path are separated from one another at proper intervals.

Furthermore, in the case of the sixth pattern, the correction controller 21 determines in which direction the correction controller 21 performs a correction operation first (with priority) based on the movement ratio of the movement distance in the X direction to the movement distance in the Y direction. When the movement distance in the X direction is longer than that in the Y direction, the correction controller 21 first performs the correction operation in the X direction (by shifting positions of the measurement points to those on the X-direction part of the circumventing path). When the movement distance in the Y direction is longer than that in the X direction, the correction controller 21 first performs the correction operation in the Y direction (by shifting positions of the measurement points to those on a Y-direction part of the circumventing path). This method, in which the correction operation is first performed in the direction of the longer movement distance, can prevent a resultant movement path from crossing the not-enterable area.

Figure 25:
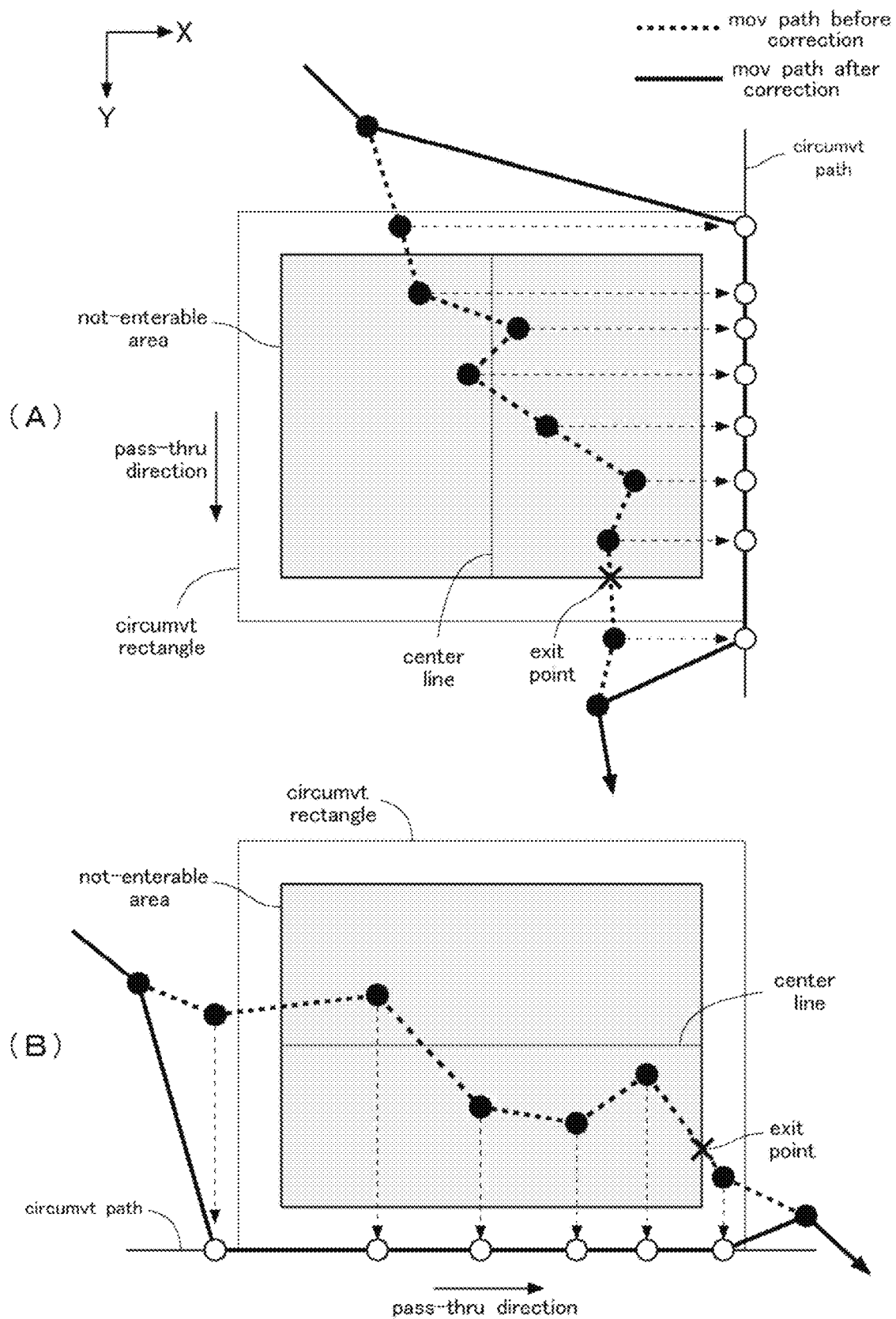
FIG. 25 is an explanatory diagram showing an outline of a correction operation for a seventh pattern.
Figure 26:
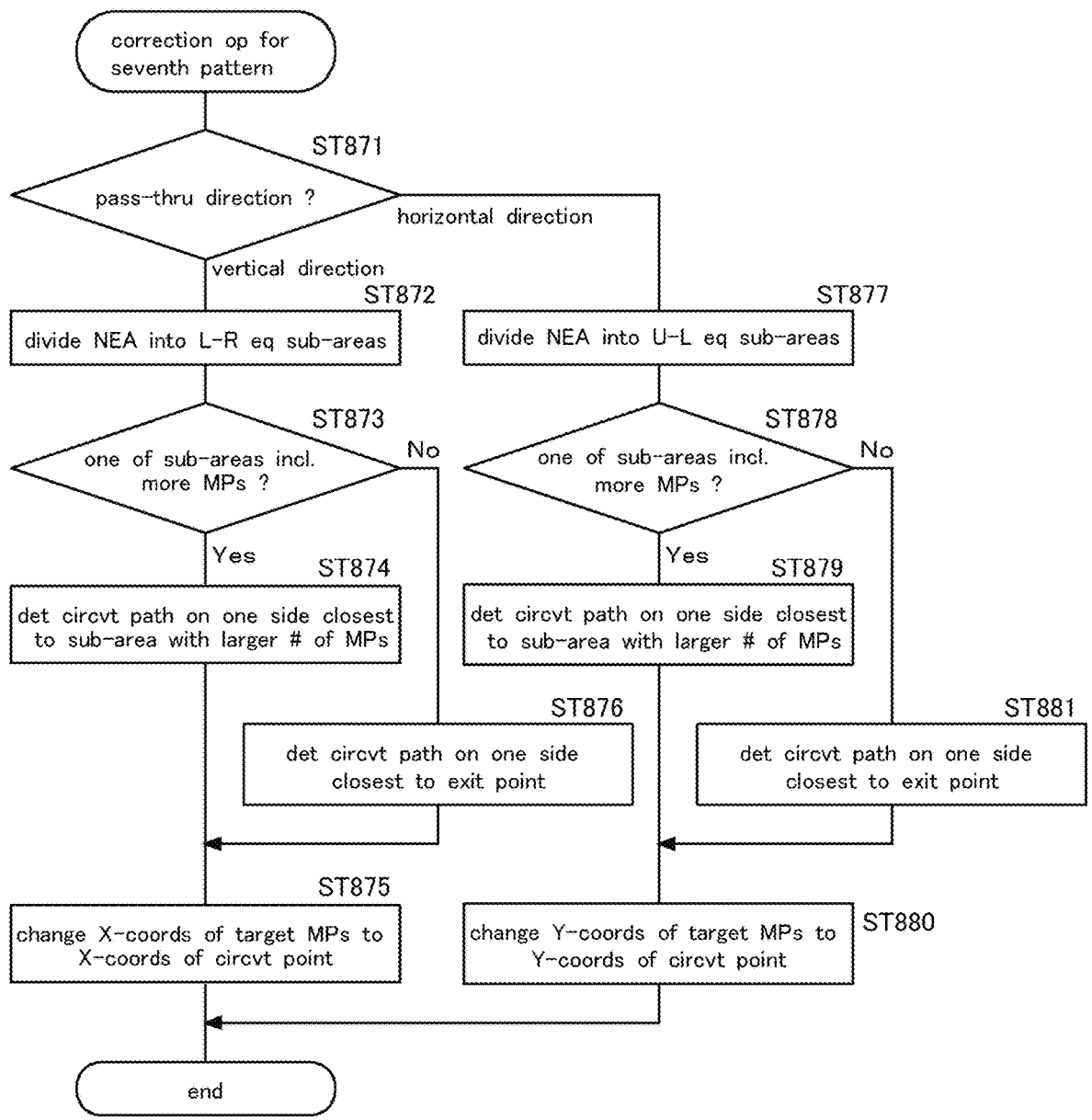
FIG. 26 is a flow chart showing an operation procedure of the correction operation for the seventh pattern.

Next, a correction operation for the sixth pattern (ST714 in FIG. 10) will be described. FIG. 25 is an explanatory diagram showing an outline of a correction operation for the seventh pattern. FIG. 26 is a flow chart showing an operation procedure of the correction operation for the seventh pattern.

In the case of the seventh pattern, the number of measurement points within a not-enterable area is equal to or greater than a threshold value, and a movement path passes straight through the not-enterable area; that is, a crossing status in which the movement path crosses two opposite sides of the not-enterable area (two-opposite-side crossing) is formed.

For the seventh pattern, the correction controller 21 first determines in which direction the movement path passes through the not-enterable area, the vertical direction (Y direction) or the horizontal direction (X direction) (ST871).

If the movement path passes through the not-enterable area in the vertical direction (Y direction) ("vertical direction" in ST871) as shown in FIG. 25A, the correction controller 21 divides the not-enterable area into left and right equal parts (ST872); that is, the not-enterable area is divided into left and right sub-areas by a center line parallel to the passing-through direction (Y direction). Then, the correction controller 21 counts respective numbers of the measurement points within the two sub-areas, and then determines whether or not one of the sub-areas includes more measurement points than the other (ST873).

If one of the sub-areas includes more measurement points than the other (Yes in ST873), the correction controller 21 determines a circumventing path on one of the two sides of the circumventing rectangle parallel to the passing-through direction (Y direction) such that the one side is close to the sub-area including more measurement points than the other side (ST874). In the example shown in FIG. 25A, the right sub-area includes more measurement points than the left sub-area, and thus, the circumventing path is determined on the right side of the circumventing rectangle.

Next, the correction controller 21 changes the X coordinates of (i) the measurement points within the not-enterable area, (ii) the measurement point immediately before the movement path enters the not-enterable area, and (iii) the measurement point immediately after the movement path exits the not-enterable area, to the X coordinate of the circumventing path (ST875). The correction operation is performed by shifting the target measurement points to perpendicular foot points drawn on the circumventing path.

If the respective numbers of measurement points within the sub-areas are equal to each other (No in ST873), the correction controller 21 determines a circumventing path on one of the two sides of the circumventing rectangle parallel to the passing-through direction (Y direction) (ST874) such that the one side is close to the exit point (ST876). Then, the process proceeds to ST875.

If the movement path passes through the not-enterable area in the horizontal direction (X direction) ("horizontal direction" in ST871) as shown in FIG. 25B, the correction controller 21 divides the not-enterable area into upper and lower equal parts (ST877); that is, the not-enterable area is divided into upper and lower sub-areas by a center line parallel to the passing-through direction (X direction). Then, the correction controller 21 counts respective numbers of the measurement points within the two sub-areas, and then determines whether or not one of the sub-areas includes more measurement points than the other (ST878).

If one of the sub-areas includes more measurement points than the other (Yes in ST878), the correction controller 21 determines a circumventing path on one of the two sides of the circumventing rectangle parallel to the passing-through direction (X direction) such that the one side is close to the sub-area including more measurement points than the other side (ST879). In the example shown in FIG. 25B, the lower sub-area includes more measurement points than the upper sub-area, and thus, the circumventing path is determined on the lower side of the circumventing rectangle.

Next, the correction controller 21 changes the Y coordinates of (i) the measurement points within the not-enterable area, (ii) the measurement point immediately before the movement path enters the not-enterable area, and (iii) the measurement point immediately after the movement path exits the not-enterable area, to the Y coordinate of the circumventing path (ST880). The correction operation is performed by shifting the target measurement points to perpendicular foot points drawn on the circumventing path.

If the respective numbers of measurement points within the sub-areas are equal to each other (No in ST878), the correction controller 21 determines a circumventing path on one side of the two sides of the circumventing rectangle parallel to the passing-through direction (X direction) (ST881) such that the one side is close to the exit point (ST881). Then, the process proceeds to ST880.

When determining a circumventing path based on the exit point (ST826, ST830), the correction controller 21 sometimes cannot determine a side of the circumventing rectangle close to the exit point because the exit point is located on the center line of the not-enterable area in the horizontal or vertical direction. In this case, a circumventing path may be determined based on a position of a measurement point immediately after the movement path exits the not-enterable area. When the measurement point immediately after the movement path exits the not-enterable area is still located on the center line, a circumventing path may be determined based on a position of the next measurement point along the movement path. Alternatively, the correction controller 21 may be configured to determine a direction to the destination of a movement path based on how the movement path extends before entering and after exiting the not-enterable area, and determine a circumventing path based on the direction to the destination.

Figure 27:
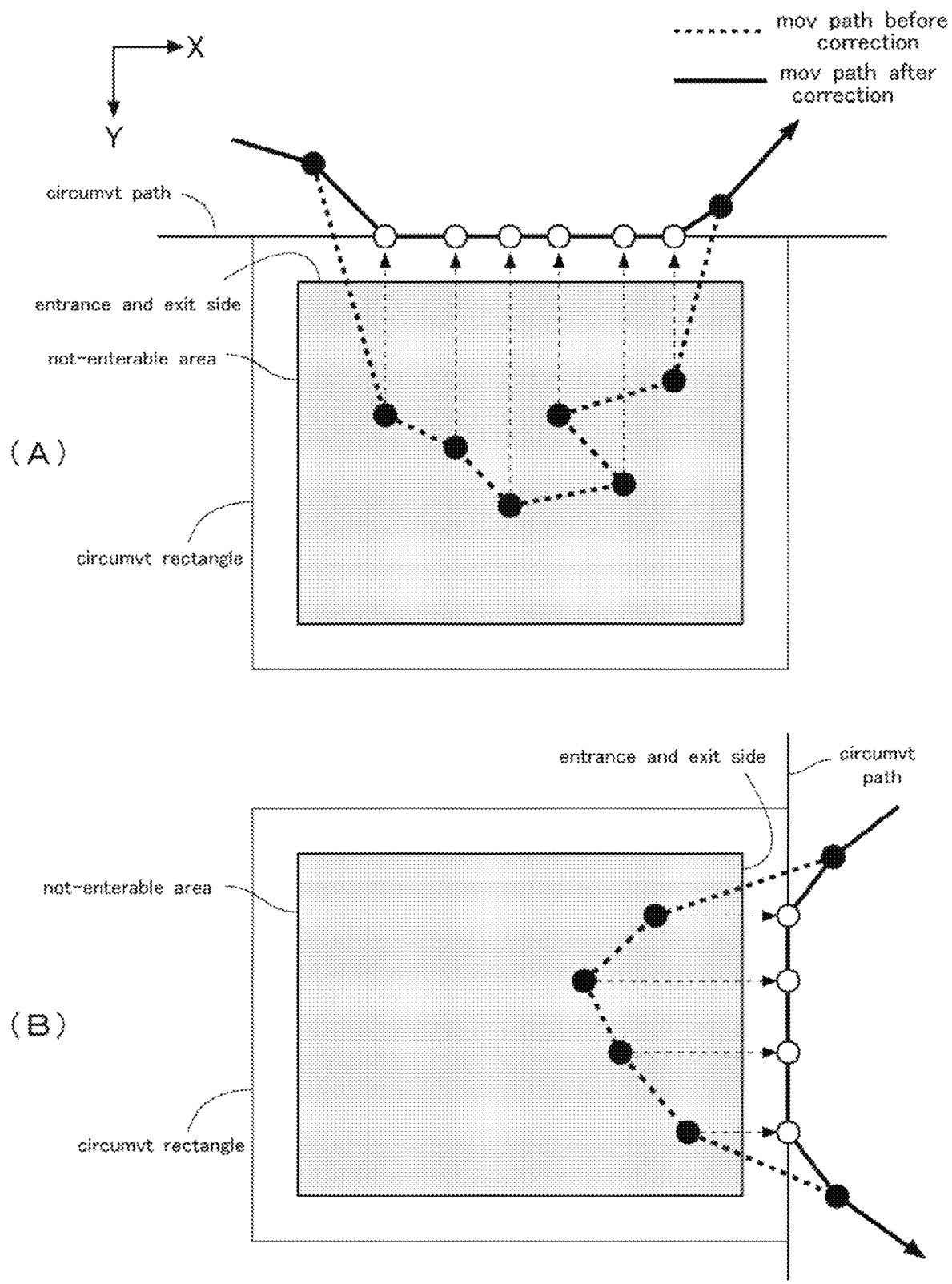
FIG. 27 is an explanatory diagram showing an outline of a correction operation for an eighth pattern.
Figure 28:
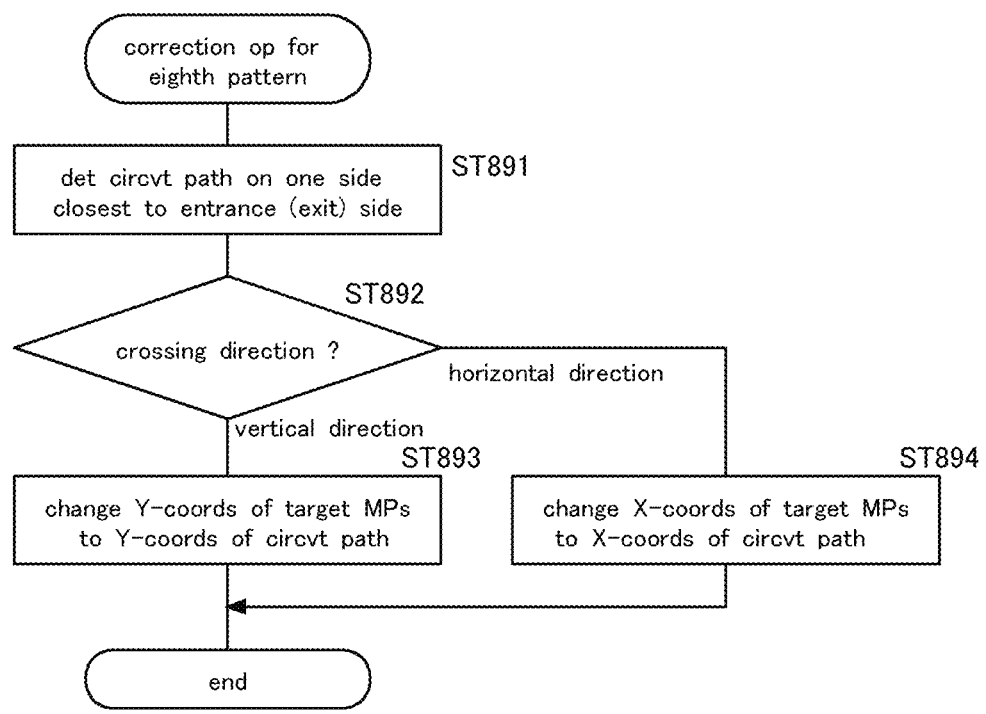
FIG. 28 is a flow chart showing an operation procedure of the correction operation for the eighth pattern.

Next, a correction operation for the eighth pattern (ST715 in FIG. 10) will be described. FIG. 27 is an explanatory diagram showing an outline of a correction operation for the eighth pattern. FIG. 28 is a flow chart showing an operation procedure of the correction operation for the eighth pattern.

In the case of the eighth pattern, the number of measurement points within a not-enterable area is equal to or greater than a threshold value, and a movement path enters and exits and the not-enterable area crossing the same side; that is, a crossing status in which the movement path crosses only one side of the not-enterable area (one-side crossing) is formed.

For the eighth pattern, the correction controller 21 determines a circumventing path on one side of a circumventing rectangle close to the entrance side (exit side) (ST891). Next, the correction controller 21 determines the crossing direction; that is, determines whether the movement path crosses the entrance side (exit side) of the not-enterable area in the vertical direction (Y direction) or the horizontal direction (X direction) (ST892).

If the movement path crosses the entrance side (exit side) of the not-enterable area in the vertical direction (Y direction) ("vertical direction" in ST892) as shown in FIG. 27A, the correction controller 21 changes the Y coordinates of the measurement points within the not-enterable area to the Y coordinate of the circumventing path (ST893).

If the movement path crosses the entrance side (exit side) of the not-enterable area in the horizontal direction (X direction) ("horizontal direction" in ST892) as shown in FIG. 27B, the correction controller 21 changes the X coordinates of the measurement points within the not-enterable area to the X coordinate of the circumventing path (ST894).

In the steps ST893 and ST894, the correction controller 21 performs the correction operation by shifting the target measurement points, i.e., only the measurement points within the not-enterable area to perpendicular foot points drawn on the circumventing path in these embodiments.

In the example of the third pattern (see FIG. 6), the fifth pattern (see FIG. 19), the sixth pattern (see FIGS. 21 to 23), and the eighth pattern (see FIG. 27), the correction controller 21 does not correct the positions of (i) the measurement point immediately before the movement path enters the not-enterable area and (ii) the measurement point immediately after the movement path exits the not-enterable area. In the example of the first pattern (see FIG. 12), the second pattern (see FIG. 14), the fourth pattern (see FIG. 17), and the seventh pattern (see FIG. 25), the correction controller corrects the positions of (i) the measurement point immediately before the movement path enters the not-enterable area and (ii) the measurement point immediately after the movement path exits the not-enterable area.

In the present embodiment, a correction operation is performed by shifting the positions of target measurement points to those on the circumventing point and the circumventing path, which is determined so as to surround the not-enterable area. In the correction operation, the positions of measurement points within the not-enterable area are changed such that the movement path circumvents the not-enterable area. In this sense, the target measurement points are generally only those within the not-enterable area. However, there are some cases where, even when the correction operation is performed on the measurement points within the not-enterable area, the corrected movement path still crosses the not-enterable area. Thus, in the present embodiment, the correction operations are also performed on the positions of (i) the measurement point immediately before the movement path enters the not-enterable area and (ii) the measurement point immediately after the movement path exits the not-enterable area, as necessary.

While specific embodiments of the present invention are described herein for illustrative purposes, the present invention is not limited to these specific embodiments. It will be understood that various changes, substitutions, additions, and omissions may be made for elements of embodiments of the present invention. In addition, elements and features of the different embodiments may be combined with each other as appropriate to yield a new embodiment of the present invention.

For example, although, in the above description, the prevent invention has been described with reference to the embodiments in which a system corrects the position data of people in rooms in a building such as a factory, the application of the present invention is not limited to this. Specifically, the present invention may be used in a facility such as an entertainment park to correct position data of people in the facility.

In addition, although, in the above-described embodiments, indoor positioning is performed in which the user terminal 1 acquires position data based on a beacon signal transmitted from the beacon transmitter 2 installed in a building, the use of the present invention is not limited to such indoor positioning. In some embodiments, the present invention may be used in positioning by utilizing a satellite positioning system such as GPS (Global Positioning System).

INDUSTRIAL APPLICABILITY

A management device, a management system, and a position correction method according to the present invention achieve an effect of allowing position data to be corrected such that a movement path circumvents a not-enterable area without reducing positioning accuracy, and are useful as a management device and a management system for managing position data of a mobile body, and a position correction method for correcting position data of a mobile body.

Glossary 1 user terminal (terminal device, mobile body)
2 beacon transmitter
3 access point
4 server (management device)
5 administrator terminal
11 communication device
12 controller
13 storage

The invention claimed is:
1. A management device for managing position information including position data of a mobile body, the device comprising:
  a storage configured to store and retain position data of the mobile body at respective time points; and
  a controller,
  wherein measurement points correspond to position data of the mobile body at respective time points, and a movement path of the mobile body connects the measurement points in a time series, and
  wherein, when the movement path passes through a not-enterable area, the controller:
  determines a crossing status with regard to how the movement path crosses the not-enterable area;
  counts a number of the measurement points within the not-enterable area; and
  corrects the position data such that the movement path circumvents the not-enterable area, using a division into cases based on the crossing status and the number of measurement points within the not-enterable area.

2. The management device according to claim 1, wherein the controller is configured to:
  set a circumventing rectangle around the not-enterable area, wherein the circumventing rectangle has two pairs of opposite sides extending in first and second directions in a Cartesian coordinate system, respectively; and
  correct the position data of measurement points which are correction targets, to position data of positions on the circumventing rectangle.

3. The management device according to claim 2, wherein the correction targets include the measurement points within the not-enterable area, a measurement point immediately before the movement path enters the not-enterable area, and a measurement point immediately after the movement path exits the not-enterable area,
  wherein the controller is configured to:
  correct position data of the measurement points which are the correction targets, to position data of positions on the circumventing rectangle.

4. The management device according to claim 2, wherein, when no measurement point is present within the not-enterable area, the controller sets at least one vertex of the circumventing rectangle as a circumventing point, and
  corrects position data of two measurement points to position data of the circumventing point, wherein the two measurement points are a measurement point immediately before the movement path enters the not-enterable area, and a measurement point immediately after the movement path exits the not-enterable area.

5. The management device according to claim 4, wherein, when the movement path crosses two adjacent sides of the not-enterable area at entrance and exit points, respectively, the controller sets a vertex of the circumventing rectangle as a circumventing point such that the vertex is close to an intersection of the two adjacent sides of the not-enterable area.

6. The management device according to claim 4, wherein, when the movement path crosses two opposite sides of the not-enterable area at entrance and exit points, respectively, the controller sets two adjacent vertices of the circumventing rectangle as circumventing points such that one of the two vertices is closest to the exit point, and the two vertices are adjacent to each other in a passing-through direction in which the movement path passes through the not-enterable area.

7. The management device according to claim 2, wherein, when the number of measurement points within the not-enterable area is less than a predetermined number, the controller sets one or more vertices of the circumventing rectangle as circumventing points; and
    corrects position data of the measurement points within the not-enterable area to position data of the circumventing points.

8. The management device according to claim 7, wherein, when the movement path crosses two adjacent sides of the not-enterable area at entrance and exit points, respectively, the controller sets a vertex of the circumventing rectangle as a circumventing point such that the vertex is close to an intersection of the two sides of the not-enterable area.

9. The management device according to claim 7, wherein, when the movement path crosses two opposite sides of the not-enterable area at entrance and exit points, respectively, the controller divides the not-enterable area into two sub-areas by a center line parallel to a passing-through direction in which the movement path passes through the not-enterable area,
    counts respective numbers of the measurement points within the two sub-areas,
    chooses one sub-area with a greater number of measurement points, and
    sets two adjacent vertices of the circumventing rectangle as circumventing points such that the two vertices are close to the chosen sub-area with the greater number of measurement points.

10. The management device according to claim 9, wherein, when the respective numbers of the measurement points within the two sub-areas are equal to each other, the controller sets two adjacent vertices of the circumventing rectangle as circumventing points such that one of the two vertices is closest to the exit point, and the two vertices are adjacent to each other in the passing-through direction.

11. The management device according to claim 1, wherein, when the number of measurement points within the not-enterable area is less than a predetermined number and the movement path crosses only one side of the not-enterable area, the controller corrects position data of measurement points within the not-enterable area to position data of a measurement point immediately before the movement path enters the not-enterable area.

12. The management device according to claim 2, wherein, when the number of measurement points within the not-enterable area is greater than a predetermined number, the controller determines a circumventing path on one or more sides of the circumventing rectangle; and
    corrects position data of the measurement points within the not-enterable area to position data of one or more positions on the circumventing path.

13. The management device according to claim 12, wherein, when the movement path crosses entrance and exit sides of the not-enterable area at entrance and exit points, respectively, the entrance and exit sides being adjacent to each other, the controller divides the not-enterable area into four sub-areas by center lines in the first and second directions,
    counts respective numbers of measurement points within the four sub-areas,
    chooses one sub-area with a greatest number of measurement points in the four sub-areas, and
    determines a circumventing path on two adjacent sides of the circumventing rectangle such that the two sides are close to the chosen sub-area with the greatest number of measurement points, and then
    corrects position data of the measurement points within the not-enterable area to position data of positions on the circumventing path by changing positions of one or more measurement points close to the entrance point to those of perpendicular foot points drawn on the circumventing path close to the entrance side of the not-enterable area, and by changing positions of one or more measurement points close to the exit point to those of perpendicular foot points drawn on the circumventing path close to the exit side of the not-enterable area.

14. The management device according to claim 13, wherein, when the numbers of measurement points of two or more sub-areas are equal to each other and greatest in the four sub-areas, the controller sets the circumventing path on two side of the circumventing rectangle which are close to the entrance and exit sides of the not-enterable area, respectively.

15. The management device according to claim 13, wherein the controller calculates first and second moving distances in the first and second directions of the movement path between the entrance point and the exit point, respectively, and
    determines, based on a rate of the first moving distance to the second moving distance, first and second sets of measurement points, wherein the first set of measurement points have positions to be changed to those on the circumventing path extending in the first direction, and the second set of measurement points have positions to be changed to those on the circumventing path extending in the second direction.

16. The management device according to claim 12, wherein, when the movement path crosses two opposite sides of the not-enterable area at entrance and exit points, respectively, the controller divides the not-enterable area into two sub-areas by a center line parallel to parallel to a passing-through direction in which the movement path passes through the not-enterable area,
    counts respective numbers of the measurement points within the two sub-areas,
    chooses one sub-area with a greater number of measurement points, and
    determines a circumventing path on one side of the circumventing rectangle such that the one side is one of the sides parallel to the passing-through direction and closer to the exit point, and then
    corrects position data of the measurement points within the not-enterable area to position data of positions on the circumventing path by changing positions of the measurement points within the not-enterable area to those of perpendicular foot points drawn on the circumventing path.

17. The management device according to claim 16, wherein, when the respective numbers of the measurement points within the two sub-areas are equal to each other, the controller determines the circumventing path on one side of the circumventing rectangle such that the one side is one of the sides parallel to the passing-through direction and closer to the exit point.

18. The management device according to claim 12, wherein, when the movement path crosses only one side of the not-enterable area, the controller determines the circumventing path on one side of the circumventing rectangle such that the one side is one of the four sides closest to an entrance side of the not-enterable area where the movement path enters the not-enterable area, and
    corrects position data of the measurement points within the not-enterable area to position data of positions on the circumventing path by changing position of the measurement points within the not-enterable area to those of perpendicular foot points drawn on the circumventing path.

19. A management system in which a management device manages position information including position data of a mobile body, wherein the management device comprises:
a storage configured to store and retain position data of the mobile body at respective time points; and
a controller,
wherein measurement points correspond to position data of the mobile body at respective time points, and a movement path of the mobile body connects the measurement points in a time series, and
wherein, when the movement path passes through a not-enterable area, the controller:
determines a crossing status with regard to how the movement path crosses the not-enterable area;
counts a number of the measurement points within the not-enterable area; and
corrects the position data such that the movement path circumvents the not-enterable area, using a division into cases based on the crossing status and the number of measurement points within the not-enterable area.

20. A position correction method for correcting accumulated position information including position data of a mobile body, wherein measurement points correspond to position data of the mobile body at respective time points, and a movement path of the mobile body connects the measurement points in a time series, and
wherein, when the movement path passes through a not-enterable area, the method is performed by a management device, which method comprises:
determining a crossing status with regard to how the movement path crosses the not-enterable area;
counting a number of the measurement points within the not-enterable area; and
correcting the position data such that the movement path circumvents the not-enterable area, using a division into cases based on the crossing status and the number of measurement points within the not-enterable area.

* * * * *